US007405008B2

(12) United States Patent
Domine et al.

(10) Patent No.: US 7,405,008 B2
(45) Date of Patent: *Jul. 29, 2008

(54) IONOMER LAMINATES AND ARTICLES FORMED FROM IONOMER LAMINATES

(75) Inventors: Joseph D. Domine, Humble, TX (US); Jeffrey Valentage, Royal Oak, MI (US); Prasadarao Meka, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 209 days.

This patent is subject to a terminal disclaimer.

(21) Appl. No.: 11/141,445

(22) Filed: May 31, 2005

(65) Prior Publication Data

US 2005/0227022 A1 Oct. 13, 2005

Related U.S. Application Data

(63) Continuation of application No. 10/472,871, filed as application No. PCT/US02/08780 on Mar. 21, 2002, now abandoned.

(60) Provisional application No. 60/279,911, filed on Mar. 29, 2001.

(51) Int. Cl.
*B32B 27/08* (2006.01)

(52) U.S. Cl. ....................... 428/516; 428/520; 428/522; 264/173.11; 264/173.14; 264/173.15

(58) Field of Classification Search ................. 428/520, 428/522, 516; 264/173.11, 173.14, 173.15
See application file for complete search history.

(56) References Cited

U.S. PATENT DOCUMENTS

| | | | | |
|---|---|---|---|---|
| 2,714,605 | A | 8/1955 | Jones et al. | 260/458 |
| 2,764,563 | A | 9/1956 | McMaster et al. | 260/2.2 |
| 3,072,618 | A | 1/1963 | Turbak | 260/79.3 |
| 3,094,144 | A | 6/1963 | Oxley et al. | 137/609 |
| 3,097,194 | A | 7/1963 | Leonard et al. | 260/88.2 |
| 3,205,285 | A | 9/1965 | Turbak et al. | 260/89.7 |
| 3,255,130 | A | 6/1966 | Keim et al. | |
| 3,264,272 | A | 8/1966 | Rees | 260/78.5 |
| 3,322,734 | A | 5/1967 | Rees | 260/79.3 |
| 3,338,734 | A | 8/1967 | Goff et al. | 117/64 |
| 3,355,319 | A | 11/1967 | Rees | 117/122 |
| 3,522,222 | A | 7/1970 | Taylor | 260/80.78 |
| 3,522,223 | A | 7/1970 | Taylor | 260/80.78 |
| 3,791,915 | A | 2/1974 | Goehring et al. | 161/227 |
| 4,136,226 | A | 1/1979 | Gilman | 428/315 |
| 4,148,972 | A | 4/1979 | Yamane et al. | 428/515 |
| 4,335,175 | A | 6/1982 | Webb | 428/213 |
| 4,656,098 | A | 4/1987 | Yonekura et al. | 428/517 |
| 4,716,085 | A | 12/1987 | Biale | 428/476.9 |
| 4,800,130 | A | 1/1989 | Yonekura et al. | 428/517 |
| 4,999,227 | A | 3/1991 | Vander Togt | 428/31 |
| 5,196,246 | A | 3/1993 | Kauss et al. | 428/39 |
| 5,206,294 | A | 4/1993 | Dawson | 525/196 |
| 5,342,666 | A | 8/1994 | Ellison et al. | 428/46 |
| 5,482,766 | A | 1/1996 | Mathavan et al. | 428/308.4 |
| 5,482,771 | A | 1/1996 | Shah | 428/349 |
| 5,504,156 | A | 4/1996 | Takezaki et al. | 525/93 |
| 5,543,233 | A | 8/1996 | Latiolais et al. | 428/516 |
| 5,554,698 | A | 9/1996 | Wang et al. | 525/330.2 |
| 5,599,877 | A | 2/1997 | Wang et al. | 525/146 |
| 5,631,328 | A | 5/1997 | Wang et al. | 525/329.7 |
| 5,643,999 | A | 7/1997 | Lee et al. | 525/193 |
| 5,718,947 | A | 2/1998 | Martin et al. | 427/243 |
| 5,725,712 | A | 3/1998 | Spain et al. | 156/230 |
| 5,728,476 | A | 3/1998 | Harwood et al. | 428/500 |
| 5,763,062 | A | 6/1998 | Smith et al. | 428/215 |
| 5,866,658 | A | 2/1999 | Talkowski | 525/183 |
| 5,888,714 | A | 3/1999 | Bourdelais et al. | 430/536 |
| 5,906,850 | A | 5/1999 | Gasse et al. | 426/412 |
| 6,106,415 | A | 8/2000 | Masutani et al. | 473/374 |
| 6,193,616 | B1 | 2/2001 | Sullivan et al. | 473/351 |
| 6,403,005 | B1 | 6/2002 | Mientus et al. | 264/173.1 |
| 2002/0009594 | A1 | 1/2002 | Smith et al. | 428/411.1 |
| 2002/0055006 | A1* | 5/2002 | Vogel et al. | 428/520 |
| 2002/0114951 | A1 | 8/2002 | Horansky | 428/412 |
| 2002/0114965 | A1* | 8/2002 | Horansky | 428/520 |

FOREIGN PATENT DOCUMENTS

| | | |
|---|---|---|
| DE | 36 26 809 | 12/1987 |
| DE | 4222832 | 1/1994 |
| DE | 197 31 051 | 1/1999 |
| EP | 0 342 244 | 11/1989 |
| EP | 0 343 877 | 11/1989 |
| EP | 0 721 856 A2 | 7/1996 |
| EP | 0 721 856 B1 | 7/1996 |
| EP | 0 630 746 | 7/1997 |
| EP | 0 950 511 | 10/1999 |
| EP | 0 635 360 | 12/1999 |
| EP | 0 980 752 | 2/2000 |
| EP | 1 038 788 | 9/2000 |

(Continued)

OTHER PUBLICATIONS

Abstract—Patent No. DE 197 31 051 (publ. Jan. 28, 1999).
Abstract—Patent No. EP 0 630 746 (publ. Jul. 23, 1997).
Abstract—Patent No. EP 0 635 360 (publ. Dec. 1, 1999).
Translation—Patent No. EP 0 721 856 B1 (publ. Jul. 17, 1996).
Translation—JP Application P2001-200069—filed Jan. 18, 2000.

(Continued)

*Primary Examiner*—Leszek Kiliman
(74) *Attorney, Agent, or Firm*—Kevin M. Faulkner; Leandro Arechederra; Shawn H. Foster

(57) ABSTRACT

The present invention includes a laminate and formation of a laminate having at least one layer of an ionomer and at least one layer of an acid polymer or blend of acid polymer and a thermoplastic polyolefin that can be thermoformed to form a shaped laminate. The shaped laminate can then be contacted with a plastic substrate such as a thermoplastic polyolefin to form a composite article by such means as, for example, injection molding. The laminate can be pigmented to eliminate the need to paint the surface of the plastic substrate. Impact and scratch resistant articles can be formed from the laminated substrate such as automotive parts, appliance body parts and sporting equipment.

156 Claims, 7 Drawing Sheets

FOREIGN PATENT DOCUMENTS

| | | |
|---|---|---|
| EP | 1 041 110 | 10/2000 |
| EP | 0 642 921 | 12/2001 |
| EP | 0 837 078 | 8/2002 |
| GB | 1011981 | 12/1965 |
| JP | 08 269409 | 11/1996 |
| JP | 3-24954 | 2/1999 |
| JP | 2000 016190 | 1/2000 |
| JP | 2000-85062 | 3/2000 |
| JP | 04 052136 | 2/2002 |
| WO | WO 95/04655 | 2/1995 |
| WO | WO 95/11929 | 5/1995 |
| WO | WO 95/19392 | 7/1995 |
| WO | WO 96/23009 | 8/1996 |
| WO | WO 96/30455 | 10/1996 |
| WO | WO 98/55296 | 12/1996 |
| WO | WO 97/02317 | 1/1997 |
| WO | WO 97/09358 | 3/1997 |
| WO | WO 97/09380 | 3/1997 |
| WO | WO 97/11995 | 4/1997 |
| WO | WO 97/27894 | 8/1997 |
| WO | WO 97/31976 | 9/1997 |
| WO | WO 97/35910 | 10/1997 |
| WO | WO 97/46381 | 12/1997 |
| WO | WO 97/46384 | 12/1997 |
| WO | WO 98/01291 | 1/1998 |
| WO | WO 98/02305 | 1/1998 |
| WO | WO 98/08902 | 3/1998 |
| WO | WO 98/24324 | 6/1998 |
| WO | WO 98/31549 | 7/1998 |
| WO | WO 98/32598 | 7/1998 |
| WO | WO 98/36003 | 8/1998 |
| WO | WO 98/03565 | 11/1998 |
| WO | WO 98/52981 | 11/1998 |
| WO | WO 99/07229 | 2/1999 |
| WO | WO 99/28791 | 6/1999 |
| WO | WO 99/51669 | 10/1999 |
| WO | WO 00/02724 | 2/2000 |
| WO | WO 00/07815 | 2/2000 |
| WO | WO 00/73148 | 12/2000 |
| WO | WO 01/74587 | 10/2001 |
| WO | WO 01/78981 | 10/2001 |
| WO | WO 02/28957 | 4/2002 |

OTHER PUBLICATIONS

Abstract—Patent No. JP 1901706, filed Jun. 30, 1986.
Abstract—Patent No. JP 49-129776, filed Dec. 12, 1974.
Abstract—Patent No. JP 56-146758, filed Nov. 14, 1981.
U.S. Appl. No. 10/469,072, filed Aug. 25, 2003, entitled "*Ionomer Laminates and Articles Formed From Ionomer Laminates*", Domine et al.
Abstract, WO 98/24324 (published Jun. 11, 1998).
Abstract, WO 00/02724 (published Feb. 20, 2000).
Abstract, WO 00/07815 (published Feb. 17, 2000).
Abstract for JP 2000 016190, published Jan. 18, 2000 (see line AJ).
Translation for DE 4222832, published Jan. 13, 1994 (see line AK).
U.S. Appl. No. : Not Yet Assigned, filed May 31, 2005, entitled "Ionomer Laminates and Articles Formed From Ionomer Laminates", Domine et al.

* cited by examiner

Fig. 1 An embodiment of the laminate
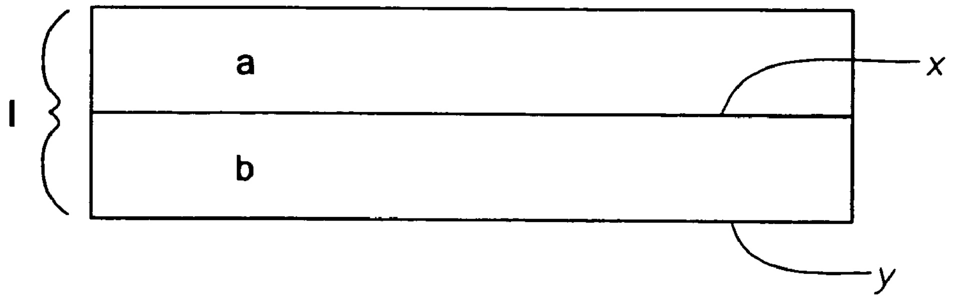
Fig. 2 An embodiment of the composite
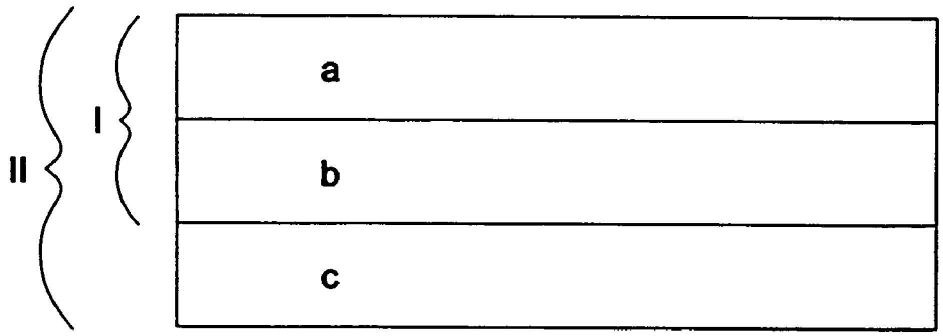
Fig. 3 Another embodiment of the composite
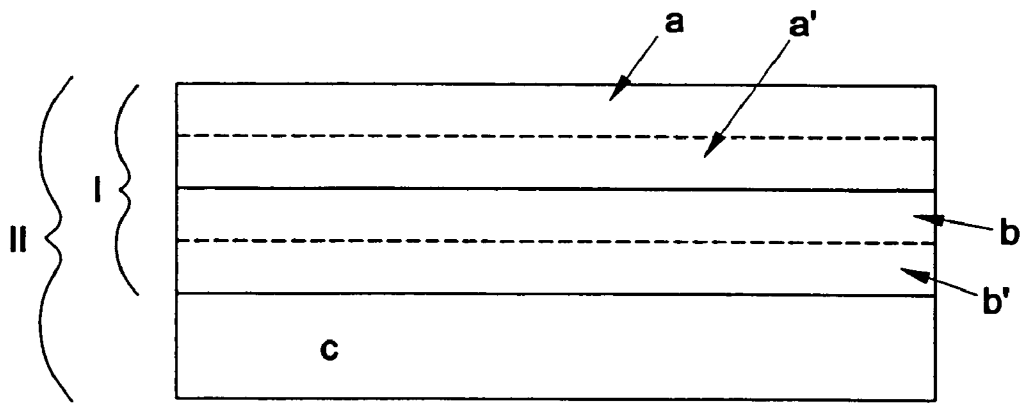

Fig. 4 An embodiment of a co-extrusion and vacuum forming (thermoforming) process.
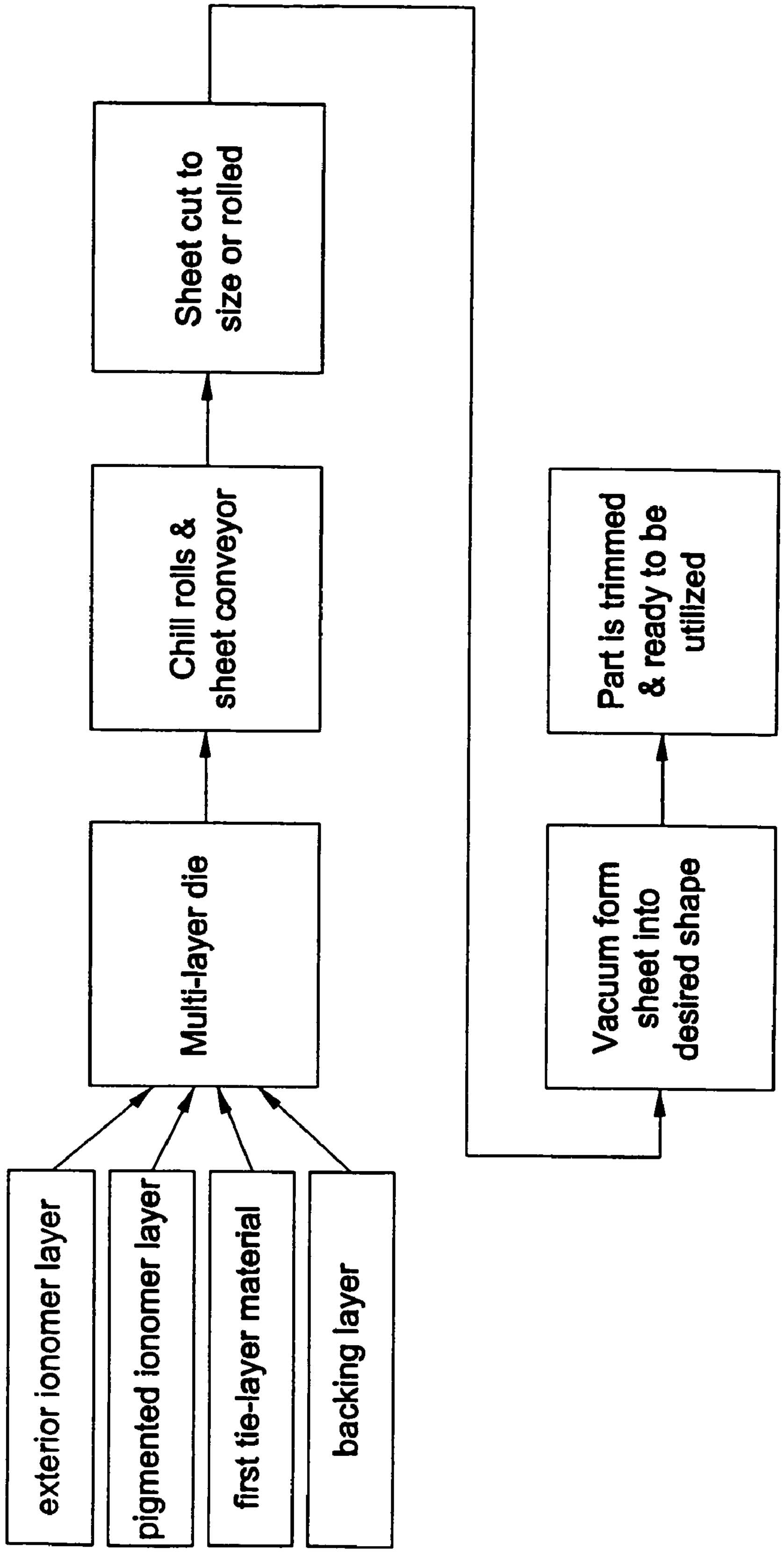

An embodiment of a co-extrusion, vacuum forming (thermoforming) and injection molding process: 4-extruder system.

An embodiment of a co-extrusion, vacuum forming (thermoforming) and injection molding process: 3-extruder system.

An embodiment of a co-extrusion, vacuum forming (thermoforming) and injection molding process: 2-extruder system.

Fig. 8 An embodiment of a co-extrusion, vacuum forming (thermoforming) and blow molding process: 3-extruder system.

An embodiment of a profile co-extrusion process:
3-extruder system.

IONOMER LAMINATES AND ARTICLES FORMED FROM IONOMER LAMINATES

CROSS REFERENCE TO RELATED APPLICATIONS

This application is a continuation of Ser. No. 10/472,871, filed Apr. 6, 2004, now abandoned which is a National Stage Application of International Application No. PCT/US02/08780, filed Mar. 21, 2002, which claims the benefit of Provisional Application No. 60/279,911, filed Mar. 29, 2001.

FIELD OF THE INVENTION

The present invention relates to composites formed from ionomer and acid polymer laminates contacted with a substrate material such as a polyolefin, and methods of making the articles from shaped ionomer/acid polymer laminates.

BACKGROUND OF THE INVENTION

Durable, glossy fascia associated with articles such as automobiles, luggage, appliances, and other durable articles made from plastics increase both the aesthetic appeal and the utility of these articles. However, due to the physical characteristics of many plastics such as polyethylene, polypropylene, polycarbonate, polystyrene, etc., it is often difficult if not impossible to color these external surfaces with traditional paints and by common painting techniques. Moreover, even when such surfaces are paintable, the paints themselves present an environmental problem. The use of paint on plastic articles increases the presence of volatile organic compounds ("VOC's") in the atmosphere, water and ground. Also, the presence of paint reduces the recyclability of the articles, as the paint must by stripped using harsh solvents prior to recycling. Thus, there is considerable interest in developing new, paint-free protective and decorative fascia for use on such articles.

Ionomer materials are known in the art, and are known to be useful in plastic films and for coating various plastic substrates. See, for example, U.S. Pat. Nos. 5,482,766, 4,148,972, 5,543,233, 4,800,130, 4,656,098, 5,206,294, 4,335,175; DE 36 26 809 A; EP 0 721 856; and JP 08269409, 2000085062, and 04052136. Ionomer coatings are useful for their scratch and abrasion resistance, as well as toughness and aesthetic appeal. A continued problem in the use of ionomers is bonding the ionomer sheet or layer to a substrate layer. This is particularly true where the substrate is pre-formed and the ionomer must then be secured onto the substrate, which is most often the case in current processes. For example, when the substrate is an automobile bumper made from such materials as polypropylene or ethylene-propylene copolymer, the substrate material is typically injection molded to form the solid bumper in a first step. In order to then color this bumper, it must either be painted with traditional automotive paints, or some material must otherwise be secured onto the bumper after it is formed, making it impractical to secure multi-layered materials such as, for example, laminated ionomer or ionomer layers, onto the bumper.

What is needed is an article that is aesthetically desirable yet needs no painting, and a method of attaching a pre-pigmented material such as an ionomer to a substrate, wherein the ionomer comprises one or more layers that is pre-formed to the shape of the desired end use article that allows the substrate to then be secured to the shaped ionomer material.

SUMMARY OF THE INVENTION

The present invention is directed to a laminate and a composite article made from this laminate including at least one layer of ionomer and a tie-layer, wherein the at least one ionomer layer and tie-layer contact one another to form a laminate. The laminate can be shaped to conform to a desirable end use article. The shaped laminate may be secured to a substrate material to form a composite article in another embodiment. Desirably, at least one ionomer layer is pigmented. The tie-layer is typically one or more layers of materials selected from acid polymers, soft ionomers, polyolefins and other thermoplastics, and blends thereof. The melt indexes (MI) of adjacent laminate layers are within less than 5 dg/min of one another in one embodiment.

In another embodiment, the tie-layer may be a blend of an acid terpolymer and a polyolefin, the polyolefin present in the blend from 10 wt % to 90 wt % of the blend, the polyolefin possessing a 1% secant flexural modulus of at least 100 MPa. In another embodiment, the tie-layer is a blend of an acid polymer and the material to be used as the substrate.

The shaped laminate can be made by any suitable techniques such as, for example, co-extrusion to form the laminate, followed by shaping to form the shaped laminate. Shaping of the laminate can be performed by any suitable means such as thermoforming or blow molding. The shaped laminate can then be secured to a substrate using any suitable technique such as injection molding, thus forming the composite article. The shaped laminate and composite article can be in the form of any useful article such as, for example, automotive interior and exterior components, fuel tanks, sporting equipment, and appliance parts, countertops and sinks, or other articles where high impact resistance and scratch resistance are desirable.

BRIEF DESCRIPTION OF THE DRAWINGS

FIG. 1 is a representation of one embodiment of the laminate of the invention;

FIG. 2 is a representation of one embodiment of the composite of the invention;

FIG. 3 is a representation of yet another embodiment of the composite of the invention;

FIG. 4 is a process flow chart of a co-extrusion/thermoforming embodiment of the invention;

DETAILED DESCRIPTION OF THE INVENTION

Figure 5:
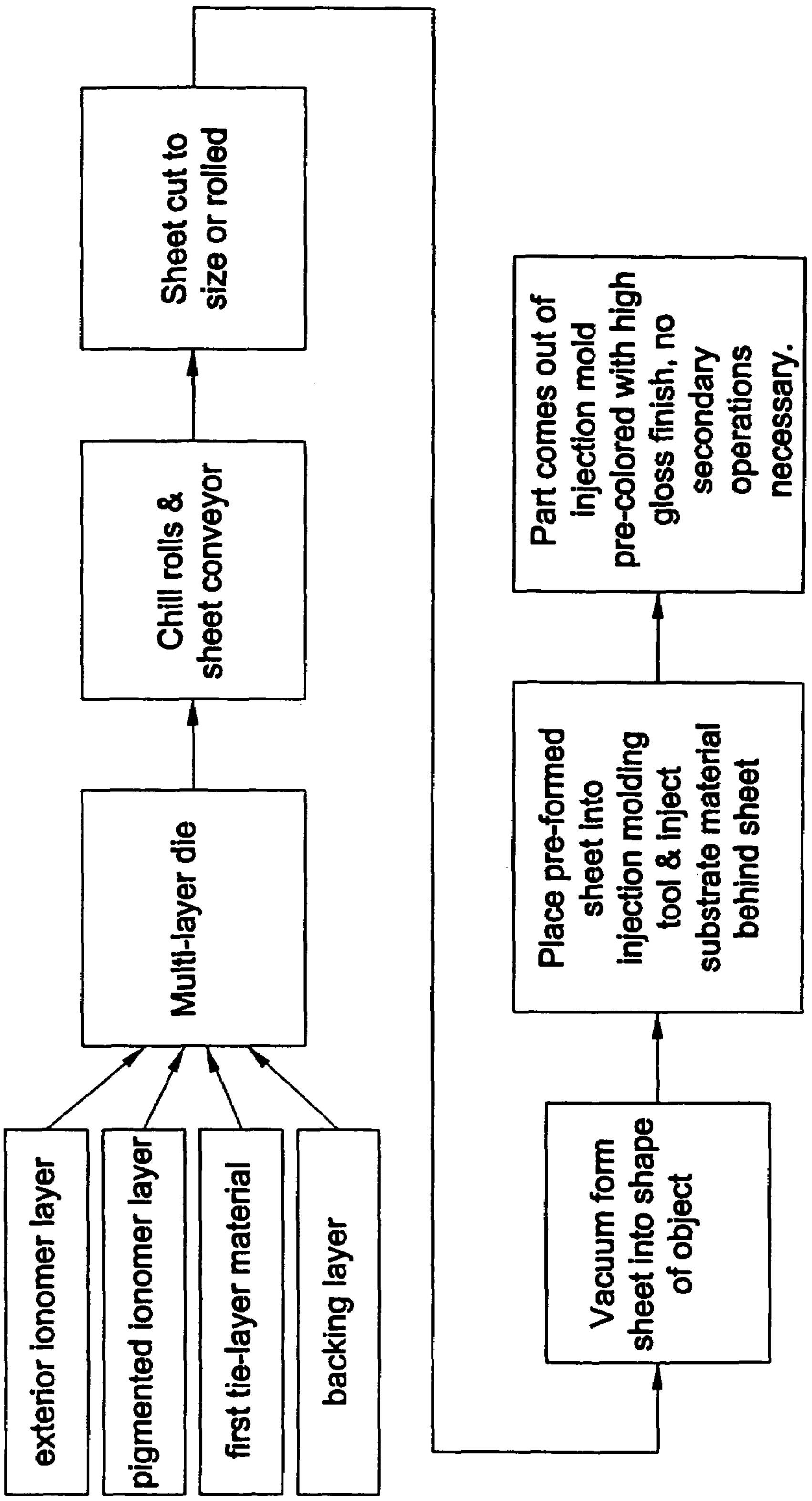
FIG. 5 is a process flow chart of a co-extrusion/injection molding embodiment of the invention.

As used herein, the term "laminate" is used to refer to any number of the same or different materials in film, sheet or layer form, each layer being secured to one another by any appropriate means such as by an inherent tendency of the materials to adhere to one another, or by inducing the materials to adhere as by a heating, radiative, chemical, or some other appropriate process. Some non-limiting process examples of forming laminates are co-extrusion, thermal lamination, or adhesive bonding, or some combination thereof.

As used herein, the term "layer" is used to refer to each of the one or more materials, the same or different, that are secured to one another by any appropriate means such as by an inherent tendency of the materials to adhere to one another, or by inducing the materials to adhere as by a heating, radiative, chemical, or some other appropriate process. The term "layer" is not limited to detectable, discrete materials contacting one another in a finished product such that a distinct boundary exists between the materials. The term "layer" includes a finished product having a continuum of materials throughout its thickness.

As used herein, the term "Groups" or "Group" refers to the new numbering scheme for the Periodic Table Groups as in Hawley's Condensed Chemical Dictionary 852 (13th ed. 1997).

The present invention includes laminates, and a method of forming the laminates, that are useful in the manufacture of scratch and impact resistant articles, while maintaining high aesthetic qualities. One embodiment of the invention, as represented in FIG. 1, is a laminate comprising a tie-layer b having a first side x and a second side y, wherein the first side is secured to at least one layer of ionomer a, and wherein the tie-layer comprises one or more layers of material selected from acid polymers, soft ionomers, thermoplastics, or blends thereof. This is shown pictorially in FIG. 1, wherein b represents the tie-layer and a represents the at least one ionomer layer, and wherein b and a are secured to one another by any suitable means to the first side of the tie-layer, the secured layers forming a laminate which can then be shaped by any suitable technique. The second side is securable to a substrate material c as shown in FIGS. 2 and 3, thus forming a composite article. The laminate may be shaped prior to securing the substrate material to the laminate, thus forming an independent article having the shape of a desirable end use article.

The laminates can be secured to a "substrate" material to form the impact resistant "composite article". Embodiments of the laminate include a multi-layered structure including at least one ionomer layer and a "tie-layer" including at least a "backing layer", wherein the one or more ionomer layers can be a blend of one or more materials, and the tie-layer can include layers of materials that are blends of one or more materials. The tie-layer is thus a means of adhering the ionomer layer or layers to the least one substrate material to form a composite article such as, for example, an exterior or interior automotive component (door, bumper, dashboard, pillar trim, etc) or appliance component (refrigerator door exterior, refrigerator door interior, clothing or dish washer exteriors, etc.).

The tie-layer may include at least one acid polymer or blend of acid polymer and other materials, and is incorporated into a laminate with at least one ionomer layer to form the laminate. The laminate layers may be formed by any conventional method known to those skilled in the art, such as by co-extrusion techniques. The laminate is formed into a shape—such as by thermoforming or blow molding in desirable embodiments—that is consistent with a desirable end use article to be manufactured. The shaped laminate is then secured to a plastic substrate material such as a polyolefin or other thermoplastic to form a composite or composite article such as by an injection molding process or other suitable technique.

Embodiments of the laminate and composite can be described as shown in the FIGS. 1-3. In the embodiment in FIG. 1, I represents the laminate having at least one ionomer layer a and a tie-layer b. It is understood that the layers a and b are not meant to be limited to only one layer, but each can be a multiple of layers or blends of materials.

An embodiment of the composite of the invention is shown in FIG. 2, wherein I represents the laminate having at least one ionomer layer a and a tie-layer b and II represents the composite comprising the laminate I and at least one substrate layer c. It is understood that the layers a, b, and c are not meant to be limited to only one layer, but each can be a multiple of layers or blends of materials. Thus, in one embodiment, the ionomer layer may include from 1 to 10 layers secured to one another, and from 1 to 4 layers in another embodiment, and from 2 to 5 layers in another embodiment, and from 2 to 3 layers in yet another embodiment, while the tie-layer may include from 1 to 10 layers of material secured to one another in one embodiment, and from 2 to 5 layers of material in another embodiment, and from 1 to 3 layers of material in yet another embodiment.

The invention is not herein limited to the discreteness of the various layers forming the laminate or composite. The layers may be distinguishable by, for example, a microscopy technique, or may be indistinguishable and, hence, continuous with one another, thus forming a continuum of layers from the exposed ionomer layer or layers to the substrate layer, or some combination there between. In a desirable embodiment of the invention, the various layers of materials are co-continuous, meaning that where the outer edges of one layer stops, the other layers also stop (as shown in FIGS. 1 through 3). However, in another embodiment, the layers are discontinuous, wherein one layer overruns another layer.

As an illustration of yet another embodiment of the composite of the invention, a laminate and composite are shown in FIG. 3, wherein the laminate I has at least two layers of ionomer materials a and a' which may be the same or different, and the tie-layer has at least two layers of materials b and b' which may be the same or different, the laminate being secured to the substrate layer c, shown as a single layer in this embodiment. The b' layer, which is securable to the substrate layer, may also be called a "backing layer", and can be made up of one or a blend of two or more materials such as acid polymers, thermoplastics such as polyolefin homopolymers, copolymers and impact copolymers, and blends thereof.

The tie-layer and substrate are secured to one another to form an area of adhesion between the two layers. Desirably, the area of adhesion is uniform and continuous. Also, in another embodiment, the final shaped composite article will be such that at least part of the at least one ionomer layer will be exposed to the external environment and be visible such as, for example, an automotive bumper or appliance exterior, while in another embodiment part or all of the ionomer layer may not be exposed to the environment or be visible. Below is a more detailed description of each component of the laminate: the at least one ionomer and tie-layer that make up I, and the substrate(s) layer that, together with the ionomer and acid polymers, make up the composite II.

Ionomer

Ionomers useful in the present invention are ionic compounds which are copolymers of $C_2$ to $C_4$ α-olefin derived units (ethylene is herein included as an "α-olefin"), and $C_3$ to $C_6$ α,β-ethylenically unsaturated carboxylic acids, and which contain one or more kinds of metallic ions associated with at least 5% of the acidic pendant groups of the polymer. Typical ionomers and methods of production are disclosed in, for example, U.S. Pat. Nos. 3,264,272, 4,911,451, 5,210,138, and 5,929,174; and WO 98/52981, 95/11929, 96/23009, 97/11995, and 97/02317, and described in 2 Comprehensive Polymer Science 755-772 (Colin Booth & Colin Price, ed. Pergamon Press 1989), in particular relating to ethylene-based materials.

The metal ion or ions suitable for forming the ionic copolymers of the present invention comprise mono, di or tri-valent metal ions in the Groups 1 through 13 of the Periodic Table of Elements. Embodiments include the following metal ions: $Na^+$, $K^+$, $Li^+$, $Cs^+$, $Ag^+$, $Hg^{2+}$, $Cu^+$, $Be^{2+}$, $Mg^{2+}$, $Ca^{2+}$, $Sr^{2+}$, $Ba^{2+}$, $Cu^{2+}$, $Cd^{2+}$, $Hg^{2+}$, $Pb^{2+}$, $Fe^{2+}$, $Co^{2+}$, $Ni^{2+}$, $Zn^{2+}$, $Al^{2+}$ $Sc^{3+}$, $Fe^{3+}$, $Al^{3+}$ and $Yt^{3+}$. In the various ions mentioned above, $Mg^{2+}$, $Na^+$ and $Zn^{2+}$ are metals used in desirable embodiments. Reaction of the carboxylic acid groups of the ionomer and a metal ion derived from a desirable metal compound (metal oxide, metal chloride, etc.) is referred to as "neutralization".

The ionomers useful in the present invention, either alone or as a blend of two or more ionomers, generally include more than 20 wt % α-olefin derived units in one embodiment by weight of the ionomer, and more than 40 wt % α-olefin derived units in another embodiment, and more than 60 wt % α-olefin derived units in one embodiment, and more than 80 wt % α-olefin derived units in yet another embodiment, and less than 95 wt % α-olefin derived units in another embodiment, and less than 85 wt % α-olefin derived units in another embodiment, and less than 75 wt % α-olefin derived units in yet another embodiment, and from 20 to 95 wt % α-olefin derived units in another embodiment, wherein a desirable range of α-olefin derived units that make up the ionomer is any combination of any upper limit with any lower limit described herein; and from 5 to 25 wt % of α,β-ethylenically unsaturated carboxylic acid derived units in one embodiment, and from 1 to 15 wt % of α,β-ethylenically unsaturated carboxylic acid derived units in another embodiment, and from 8 to 20 wt % of α,β-ethylenically unsaturated carboxylic acid derived units in another embodiment, wherein a desirable embodiment of a useful ionomer may comprise any upper wt % limit and any lower wt % limit of any α,β-ethylenically unsaturated carboxylic acid derived units described herein.

The polymer may be neutralized to form the ionomer to any degree between 10% to 90% based on the total amount of neutralizable carboxylate groups in one embodiment, and from 20% to 80% in another embodiment, and from 40% to 75% in yet another embodiment, and from 5% to 70% in yet another embodiment, provided the necessary scratch and mar resistance is maintained. A desirable level of neutralization may include any upper neutralization % limit and any lower neutralization % limit described herein.

One embodiment of an ionomer can be described as in the following structure (1):

(1)

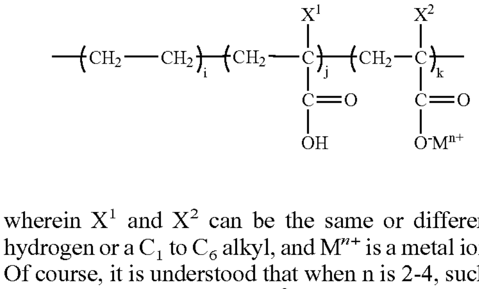

wherein $X^1$ and $X^2$ can be the same or different and are hydrogen or a $C_1$ to $C_6$ alkyl, and $M^{n+}$ is a metal ion or $NH_4^+$. Of course, it is understood that when n is 2-4, such as with a divalent metal ion such as $Zn^{2+}$, that charge neutrality for the ionomer is achieved by reaction with a total of n acid groups from either the same polymer chain, or an adjacent polymer chain. The structure (1) is not intended to be construed that the ionomer is a block copolymer or limited to being a block copolymer. The values of i, j, and k are determined by the following relationships (2) and (3):

$$\frac{j+k}{i+j+k}=Q \qquad (2)$$

$$\frac{k}{j+k}=P \qquad (3)$$

wherein Q is from 10 to 40% of the polymer units derived from the acidic monomer(s) relative to the total weight of the ionomer in one embodiment, and from 15 to 20% of polymer units derived from the acidic monomer(s) in another embodiment, and P is from 10 to 80% of the acidic groups neutralized with the metallic ions in one embodiment, and from 20 to 70% of the acidic groups neutralized with the metallic ions in another embodiment, and from 20 to 60% in yet another embodiment, and further ranges as stated above. The polymer component i, derived from ethylene in one embodiment, can be linear or branched.

The ionomers or blends of two or more ionomers should be capable of being formed into a sheet or skin having a thickness of from 25 μm to 6000 μm, and from 25 μm to 700 μm in another embodiment, and possess a high gloss, scratch resistance and abrasion resistance. Useful ionomers or ionomer blends have a peak melt temperature of greater than 75° C. in one embodiment, and between 75° C. and 100° C. in another embodiment, and between 75° C. and 95° C. in one embodiment, and between 80° C. and 90° C. in another embodiment; and a melt index (MI) of between 0.1 dg/min and 30 dg/min (ASTM D1238, 190/2.16) in one embodiment, from 0.2 to 8 dg/min in one embodiment, from 0.5 to 5 dg/min in another embodiment, and from 0.8 to 2.5 dg/min in yet another embodiment, wherein a desirable range may be any combination of any upper MI limit with any lower MI limit described herein.

The ionomers useful in the present invention should provide high scratch and impact resistance to the laminate and composite. The ionomers or ionomer blends have a 1% secant flexural modulus (ASTM D-790) of greater than 100 MPa in one embodiment, and greater than 300 MPa in another embodiment, and greater than 400 MPa in yet another embodiment, between 150 and 400 MPa in one embodiment, and from 200 to 350 MPa in another embodiment. Desirable ionomers are ethylene methacrylic acid copolymer ionomers and ethylene acrylic acid copolymers ionomers and the like. Particularly desirable ionomers are those that are sodium or zinc salts of acrylic acid or methacrylic acid copolymers.

Further, in a desirable embodiment, certain blends of ionomers based on ethylene acrylic acid copolymer neutralized with divalent and monovalent metal ions (cations) such as $Zn^{2+}$ and $Na^+$ display a synergistic MI "uplift" as disclosed in, for example, U.S. Pat. Nos. 5,210,138, and 5,929,174 are useful. In one embodiment of the invention, one or more of the ionomer layers that make up the laminate is a blend of a first ionomer having an MI value of from 0.6 to 1.0 dg/min, and a second ionomer having an MI value of from 2.1 to 3.0 dg/min. The blend of the first and second ionomers includes from 45 wt % to 95 wt % of the first ionomer in one embodiment, and from 55 wt % to 85 wt % of the first ionomer in another embodiment, and from 65 wt % to 80 wt % of the first ionomer in yet another embodiment, and from 72 wt % to 78 wt % of the first ionomer in yet another embodiment, and 75 wt % of the first ionomer in yet another embodiment, wherein a desirable range may include any upper wt % limit and any lower wt % limit described herein. The blends may include blends of two or more ionomers having different metallation (different metals and/or different % of metallation), different MI values, or a combination of variables.

Other examples of ionomers useful in the present invention include, but are not limited to, butadiene-acrylic acid copolymer ionomers, perfluorsulfonate ionomers, perfluorocarboxylate ionomers, telechelic polybutadiene ionomers, sulfonated ethylene-propylene-diene terpolymer ionomers, styrene-acrylic acid copolymer ionomers, sulfonated polystyrene ionomers, sulfonated polypentenamer ionomers, telechelic polyisobutylene sulfonated ionomers, alkyl methacrylate-sulfonate copolymer ionomers, styrene-based polyampholytes ionomers and acid-amine ionomers and the like. Typical examples of ionomers employing salts of carboxylic acid type pendent groups are disclosed in GB 1,011, 981; U.S. Pat. Nos. 3,264,272; 3,322,734; 3,338,734; 3,355, 319; 3,522,222; and 3,522,223. Typical examples of ionomers employing phosphonate-type pendent groups include those disclosed in U.S. Pat. Nos. 3,094,144; 2,764, 563, 3,097,194; and 3,255,130. Typical examples of ionomers employing sulfonate-type pendent groups include those disclosed in U.S. Pat. Nos. 2,714,605; 3,072,618; and 3,205, 285. Other useful ionomers are disclosed generally in U.S. Pat. Nos. 5,631,328, 5,631,328, 5,554,698, 4,801,649, 5,320, 905, 5,973,046, and 4,569,865.

Ionomers comprising copolymers of ethylene derived units, acrylic acid (AA) derived units are desirable. As shown in Table 1, examples of commercially available ionomers include, but are not limited to, IOTEK ionomers (ExxonMobil Chemical Company, Houston, Tex.), such as IOTEK 8000, a 45% sodium neutralized ethylene-based ionomer of 15 wt % acrylic acid (prior to neutralization), and IOTEK 7030, a 25% zinc neutralized ethylene-based ionomer of 15 wt % acrylic acid, and SURLYN ionomers (DuPont Company, Wilmington, Del.).

The one or more ionomer layers may contain additives such as antioxidants, pigments or dies, and other agents. In one embodiment, at least one layer of ionomer in the final composite will have a pigment, antioxidant, or other additives. For external uses, it is desirable to add a UV stabilizer such as TINUVEN 791 (CIBA Specialty Chemicals) or UVASIL 2000 HM or LM (Great Lakes Chemicals), both silicon based compositions. Also, for scratch resistance, it is advantageous to add siloxane based compositions such as MB50-001 and/or MB50-321 (Dow Corning Corporation). Effective levels are known in the art and depend on the details of the base polymers, the fabrication mode and the end application. In addition, hydrogenated and/or petroleum hydrocarbon resins and other plasticizers may be used as modifiers.

Other examples of additives include one or more of the following: heat stabilizers or antioxidants, neutralizers, slip agents, antiblock agents, pigments, antifogging agents, antistatic agents, clarifiers, nylon and other polyamides and thermoplastic resins, nucleating agents, ultraviolet absorbers or light stabilizers, fillers, rosins or rosin esters, waxes, additional plasticizers and other additives in conventional amounts. In one embodiment, a metallic or metal flake pigment such as is used in the automotive industry may be used. The pigment may be included in a first, second, third ionomer layer, or any other layer. For example, the pigment may desirably be in a second layer only, the first layer having no pigment and providing gloss and scratch resistance to the laminate. This second layer may have metallic pigment or metal flake blend and be processed in a manner such that the final product has a shiny, metallic look, and changes appearance dependent upon the angle of view ("flop") useful in, for example, exterior automotive components, or a dull look useful in, for example, interior automotive components.

Tie-Layer

In one embodiment of the invention, the tie-layer material (b and b', etc. in FIGS. 1-3) is an acid polymer, and can comprise one layer or more of identical or different acid polymers. In another embodiment, the at least one tie-layer can be a blend of an acid polymer and another polymer such as an α-olefinic polymer (or other thermoplastic, as described further for "Substrates"). Desirably, at least the backing layer is a blend of an acid polymer and the material to be used as the substrate material in the finished composite article. The tie-layer, comprising at least one layer of material, is secured to at least the ionomer layer or layers in one embodiment, and the substrate layer in a further embodiment. The tie-layer may have a thickness in the range of from 2.5 μm to 6000 μm in one embodiment, and from 25 μm to 650 μm in another embodiment, from 2.5 μm to 400 μm in yet another embodiment, from 2 μm to 100 μm in yet another embodiment, and from 10 μm to 1000 μm in yet another embodiment.

Acid polymers represent a broad class of compounds typically formed by the copolymerization of unsaturated carboxylic acid and at least one α-olefin. Desirably, the carboxylic acid may be formed from a carboxylic acid alone or in combination with an ester. More particularly, the acid polymer may be an acid terpolymer represented by the following structure (4):

(4)

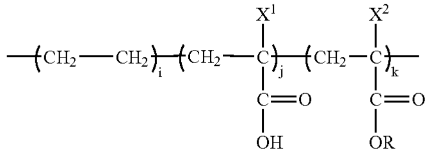

wherein $X^1$ and $X^2$ can be the same or different and are hydrogen or a $C_1$ to $C_6$ alkyl, R can be a $C_1$ to $C_{10}$ normal alkyl or branched alkyl in one embodiment, and a $C_1$ to $C_4$ normal alkyl or branched alkyl in another embodiment, j has a value of from 5 to 15% relative to the acid terpolymer weight, and k has a value of from 5 to 25%, and i has a value of from 60 to 90%. The structure (4) is not intended to be construed that the acid polymer is a block copolymer or limited to being a block copolymer. In one embodiment, the acid polymer may be partially neutralized, creating a so called "soft ionomer", or partially neutralized acid polymer, wherein the degree of neutralization is from 10% to 75%. The neutralized carboxylic acid groups can be characterized as above for the ionomer. So called soft ionomers are disclosed in, for example, WO 97/02317.

The acid polymers useful as tie-layer materials have a melt index (MI) of from 0.1 to 40 dg/min in one embodiment, from 1 to 30 dg/min in another embodiment, from 2 to 20 dg/min in yet another embodiment, and from 2.5 to 10 dg/min in yet another embodiment (ASTM D1238, 190/2.16), a desirable range including a combination of any upper MI limit and any lower MI limit disclosed herein.

In one embodiment of the invention, the acid polymers are acid terpolymers, which comprise terpolymers of ethylene derived units, alkyl acrylate derived units, particularly methyl acrylate derived units, and acrylic acid derived units, such as disclosed in U.S. Pat. Nos. 5,397,833, and 5,281,651, and herein referred to as "EAAT". Other useful acid polymers are disclosed in U.S. Pat. Nos. 4,307,211, and 5,089,332. In one embodiment, the acid polymer useful in the tie-layer of the laminate is a terpolymer of ethylene derived units, alkyl acrylate derived units, and acrylic acid derived units, wherein the alkyl acrylate derived unit is selected from methyl acrylate, ethyl acrylate, propyl acrylate, butyl acrylate and combinations thereof.

In one embodiment of the acid polymer used in the present invention is an ethylene/methyl acrylate/acrylic acid (E/MA/AA) terpolymer comprising an acrylate content of from 4 to 40 wt % based on the weight of the entire polymer, from 5 to 35 wt % in another embodiment. The acrylic acid derived unit content is from 1 to 10 wt % in one embodiment, and from 2 to 8 wt % in another embodiment. Described another way, a desirable acid terpolymer is a terpolymer of acrylic acid derived units from 5 wt % to 15 wt % of the polymer, and methyl acrylate derived units from 5 wt % to 25 wt % of the polymer. The remainder of the terpolymer is made up of ethylene derived units.

The E/MA/AA terpolymer may comprise a wide range of melt indexes (MI), generally between 0.1 to 100 dg/min in one embodiment, from 0.1 to 30 dg/min in one embodiment, and from 1 to 10 dg/min in another embodiment, and from 0.5 to 5 dg/min in yet another embodiment (ASTM D1238, 190/2.16), a desirable MI embodiment of the terpolymer comprising any upper MI limit with any lower MI limit described herein.

As shown in Table 1, commercial examples of acid polymers useful in the tie-layer of the invention include, but are not limited to, ESCOR AT-310 resin having 6.5 wt % methyl acrylate derived units and 6.5 wt % acrylic acid derived units, and ESCOR AT-320 having 18 wt % methyl acrylate derived units and 6 wt % acrylic acid derived units, both are ethylene acid terpolymers (ExxonMobil Chemical Company, Houston, Tex.). Soft ionomers are commercially available as IOTEK 7510, a 69% zinc neutralized acid terpolymer of 6 wt % acrylic acid and 20 wt % methyl acrylate (prior to neutralization), and IOTEK 7520, a 43% neutralized acid terpolymer of 6 wt % acrylic acid and 20 wt % methyl acrylate, also available from ExxonMobil Chemical Company.

The material that makes up the at least one tie-layer, or alternately, the backing layer, may be selected from acid polymers, soft ionomers, and thermoplastics such as, for example, polypropylene homopolymers and copolymers, polyethylene homopolymers and copolymers, impact copolymers (ICP), polycarbonates, polyamides, and blends thereof. Other suitable thermoplastics are described below ("Substrate"), and may be used in any amount as described herein. Acid polymers, or blends of the acid polymer with a thermoplastic, are desirable tie-layer materials. In one embodiment, one layer of the tie-layer is made from an acid polymer and a high density polyethylene polymer blend. In another embodiment, the tie-layer is a acid polymer and a polypropylene blend. In yet another embodiment, one layer of the tie-layer is a blend of an acid polymer and an impact copolymer.

In a desirable embodiment, the tie-layer is made up of at least a first layer and a backing layer, and any number of intervening layers, the first layer being secured to the ionomer layer, and the backing layer being securable to a substrate, wherein the backing layer is a blend of an acid polymer, desirably an acid terpolymer, and the material to be used as the substrate in the composite article. The blend may include from 10 wt % to 90 wt % of the acid terpolymer by weight of the backing layer blend in one embodiment, and from 20 wt % to 80 wt % in another embodiment, and from 25 wt % to 65 wt % in yet another embodiment, and from 40 wt % to 60 wt % in yet another embodiment, a desirable embodiment of the backing layer including any combination of any upper acid terpolymer wt % limit and any lower acid terpolymer wt % limit described herein.

The substrate materials used to blend with the at least one tie-layer material has a 1% secant flexural modulus (ASTM D-790) of greater than 100 MPa in one embodiment, greater than 200 MPa in another embodiment, greater than 300 MPa in yet another embodiment, and greater than 500 MPa in yet another embodiment, and greater than 900 MPa in yet another embodiment, and less than 100,000 MPa in yet another embodiment.

Polyolefins that comprise at least 60 wt % isotactic repeating units are desirable in one embodiment of the invention, and at least 70 wt % isotactic repeating units in another embodiment.

While suitable tie-layer materials useful for blending with acid polymers may include some amorphous, rubber material (e.g, ICPs), highly amorphous polymers that are liquid at room temperature or slightly above, such as is common for "hot melt adhesives", are substantially absent from the tie-layer in one embodiment of the present invention. This means that hot melt adhesives are present, if at all, to an extent no greater than 1 wt % of the tie-layer in one embodiment of the invention. In another embodiment of the tie-layer, ethylene vinyl acetate (EVA) is substantially absent, meaning that it is present, if at all, to an extent no greater than 0.5 wt % of the tie-layer. Finally, in yet another embodiment, pressure sensitive adhesives are substantially absent, meaning that they are present, if at all, to an extent no greater than 0.1 wt % of the tie-layer.

The tie-layer may also include additives as described above for the ionomer layers, such as pigments, dyes, antioxidants, antiozonants, and other agents to improve its performance. Examples include one or more of the following: heat stabilizers or antioxidants, neutralizers, slip agents, antiblock agents, pigments, antifogging agents, antistatic agents, clarifiers, nucleating agents, ultraviolet absorbers or light stabilizers, fillers, rosins or rosin esters, waxes, additional plasticizers and other additives in conventional amounts.

Substrate

A substrate material, as defined herein, is any material securable by any means known in the art, to the laminate. Desirably, the substrate is contacted with and secured to the tie-layer, desirably the second side y of the tie-layer, to form a composite or composite article. Described another way, the substrate may be secured to the backing layer of the tie-layer in a multi-layer embodiment. The substrate material desirably has a 1% secant flexural modulus as described above for substrate materials suitable for blending to form the backing layer.

In one embodiment of the invention, the substrate is any "thermoplastic" material such as defined in POLYMER TECHNOLOGY DICTIONARY 443 (Tony Whelan, ed., Chapman & Hall 1994) in any form, including foams. Such materials include so called polyolefins, engineering thermoplastics, thermoplastic rubbers, elastomers, plastics, and other thermoplastics known in the art, and more particularly include such materials as polypropylene homopolymer, copolymers and impact copolymers (ICP), polyethylene homopolymers and copolymers (LLDPE, LDPE, HDPE, etc.), EPDM (ethylene-propylene-diene monomer) or EP (ethylene-propylene rubber), plastomers, acrylonitrile-butadiene-styrene terpolymer, acetal polymer, acrylic polymers, cellulosics, fluoroplastics, nylon and other polyamides, polyamide-imide, polycarbonate, polyester, polyetheretherketone, polyetherimide, polyethylene, polyimide, polyphenylene, polyphenylene sulfide, polypropylene, polystyrene, polysulfone, polyurethane, polyvinyl chloride, and foams of such materials, as well as blends of these materials and other materials such as described in, for example, HANDBOOK OF PLASTICS, ELASTOMERS, AND COMPOSITES 3.18-3.25 (Charles A. Harper, ed., McGraw-Hill Inc. 1992). Suitable thermoplastics or blends of thermoplastics can be made by any suitable means known in the art, and can be made either by physical blending or in-situ reactor-made.

Desirably, the substrate material has a melt flow rate (MFR) of greater than or equal to 10 dg/min in one embodiment (ASTM D1238, 230/2.16), and greater than 20 dg/min in another embodiment, a 1% secant flexural modulus (ASTM D-790) of greater than 100 MPa or higher (and as defined above for polymers suitable for blending with the tie-layer), and is capable of being processed such as by injection molding or blow molding, or other such processes described herein for securing such material to the laminate of the invention.

Suitable thermoplastics include thermoplastic polyolefins such as homopolymers, copolymers, or a combination thereof. These thermoplastic polyolefins may be blended with the acid polymers described above and/or with modifiers, described in greater detail below. More particularly, these thermoplastic polymers may be linear or branched polymers and include polyethylene polymers, polyethylene copolymers, polypropylene polymers and polypropylene copolymers having densities in the range from 0.85 to 0.95 g/cm$^3$. Suitable comonomer reactants may include one or a combination of either ethylene, $C_3$-$C_{30}$ α-olefins or diolefins. Examples of diolefins include α,ω-diene and more particularly, α,ω-dienes that contain at least 7 carbon atoms and have up to about 30 carbon atoms. Representative examples of such α,ω-dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and the like. Additionally, α,ω-dienes containing aliphatic, cyclic or aromatic substituents may also be used. Other useful substrate materials are the class of dynamically vulcanized alloys of nylon and copolymers of isobutylene and p-methylstyrene.

One embodiment of a suitable substrate is a polypropylene or polyethylene material. The polypropylene may be homopolypropylene, propylene based copolymers, impact copolymers or block copolymers, or combinations thereof. The term "polypropylene", as used in this description and the appended claims, is defined to mean any propylene based polymer having a propylene-derived content of at least 60 wt % by weight of the polypropylene. In most applications it will be desirable that the polypropylene phase be continuous or nearly continuous. The polyethylene may be homopolyethylene, ethylene based copolymers, block copolymers, plastomers, and ethylene based rubbers as is common in the art. The term "polyethylene", as used in this description and the appended claims, is defined to mean any ethylene based polymer having an ethylene-derived content of at least 50 wt % by weight of the polyethylene.

Another suitable substrate material is a so called plastomer, which, in one embodiment is a copolymer and a $C_3$ to $C_{10}$ α-olefin and ethylene having a density in the range of less than 0.915 g/cm$^3$. In another embodiment, the plastomer useful in the invention has a density in the range of from 0.85 to 0.97 g/cm$^3$ and a melt index (MI) between 0.10 and 20 dg/min. Plastomers can also be described as metallocene catalyzed copolymers of ethylene and higher α-olefin comonomers such as propylene, 1-butene, 1-hexene and 1-octene, and which contain enough of one or more of these comonomers to yield a density between 0.85 and 0.915 g/cm$^3$. An example of a commercially available plastomer is EXACT 4150, a copolymer of ethylene and 1-hexene, the 1-hexene derived units making up 18.5 wt % of the plastomer (ExxonMobil Chemical Company, Houston, Tex.).

Polyethylene and polypropylene copolymers and homopolymers are also desirable substrates. The polyethylene polymers may include low density polyethylene (LDPE), linear low density polyethylene (LLDPE), high density polyethylene (HDPE). These ethylene polymers are well known in the art and include both ethylene homopolymers and copolymers with higher α-olefins. As shown in Table 1, examples of polyethylene polymers include: HD9856B resin, a broad molecular weight bi-modal homopolymer; EXCEED 357C32 resin, an ethylene/hexene copolymer; HD-6908, a narrow molecular weight homopolymer; LL-6201, a LLDPE, an ethylene-butene copolymer, and EXACT™ plastomers, lower density ethylene-butene copolymers, all available from ExxonMobil Chemical Company (Houston, Tex.).

Impact copolymers may be useful as the substrate material, as well as in one or more of the tie-layers, desirably the backing layer. As used herein, the term "impact copolymer" ("ICP") shall mean those blends of polypropylene and rubber which are substantially thermoplastic and have a flexural modulus in the range of 40,000-250,000 psi (270-1750 MPa). The ICPs have a "polypropylene component" and a "rubber component". Most typically, useful ICPs have a polypropylene content in the range of 50 wt % to 95 wt % in one embodiment, and from 50 wt % to 85 wt % in another embodiment; and a rubber content in the range of up to 50 wt % in one embodiment, and a rubber content of up to 25 wt % in another embodiment. The rubber may include up to 70 wt % ethylene derived units or other $C_4$ to $C_{10}$ α-olefin derived units by weight of the rubber, or from 20 to 70 wt % ethylene derived units or other $C_4$ to $C_{10}$ α-olefin derived units by weight of the rubber in another embodiment, or from 40 to 60 wt % ethylene derived units or other $C_4$ to $C_{10}$ α-olefin derived units in yet another embodiment. A suitable example of an impact copolymer useful as the substrate is ExxonMobil PP8224, a blend of a plastomer and impact copolymer having 69 wt % polypropylene, 14.1 wt % ethylene-propylene rubber, and 17 wt % ethylene-hexene plastomer (ExxonMobil Chemical Company, Houston Tex.).

The manner in which the ICPs are produced is not critical to the present invention. They can be produced by conventional melt blending of the individual components, by "reactor blending" ("reactor produced"), by combinations of these two processes, or other means which achieves a dispersion of discrete elastomer regions within a substantially continuous polypropylene matrix. By "reactor blending", it is meant that the polypropylene and rubber components are produced in situ during a single or multiple stage polymerization process. The rubber phase exists in discrete domains dispersed throughout the polypropylene phase. Most commonly, the rubber will be an ethylene-propylene rubber or an ethylene-propylene terpolymer rubber, however, other rubber compositions may be used. The term "rubber", as used in this description and the appended claims shall mean any essentially non-crystalline polymeric component having a low glass transition temperature (typically $\leqq -35°$ C.), typically a copolymer of propylene derived units and at least one other monomer derived unit selected from ethylene and at least one $C_4$ to $C_{10}$ α-olefin.

The ICP useful in the present invention may be made using any appropriate polymerization process. In one embodiment, the process includes the use of a metallocene catalyst system. Such systems are well known in the art, and are able to produce ICPs having certain desirable characteristics. The ICP may have a narrow molecular weight distribution Mw/Mn ("MWD") of less than 4.0 in one embodiment, less than 3.5 in another embodiment, and less than 3.0 in yet another embodiment, and less than 2.5 in yet another embodiment. These molecular weight distributions are obtained in the absence of visbreaking using peroxide or other post reactor treatment designed to reduce molecular weight. The ICP has a weight average molecular weight (Mw as determined by GPC) of at least 100,000, at least 200,000 in another embodiment, and a melting point (Mp) of at least 145° C., at least 150° C. in another embodiment, at least 152° C. in yet another embodiment, and at least 155° C. in yet another embodiment.

In one desirable embodiment, the metallocene produced impact copolymer is reactor produced, wherein the "polypropylene component" of the copolymer is produced in one stage, and the "rubber component" is produced in another stage in the presence of the polypropylene component.

Another feature of metallocene produced ICPs is the amount of amorphous polypropylene they contain, as determined by hexane extractables levels. The ICPs of this invention may be characterized as having low amorphous polypropylene in the polypropylene component (non-rubber component) of the ICP, less than 3% by weight in one embodiment, less than 2% by weight in another embodiment, and less than 1% by weight in yet another embodiment. In yet another embodiment, there is no measurable amorphous polypropylene.

In another embodiment, the polymerization process to make useful ICPs for the substrate includes the use of a Ziegler-Natta catalyst system. Examples of suitable catalysts systems and methods of production are found in U.S. Pat. Nos. 6,087,459, 5,948,839, 4,245,062, and 4,087,485. Examples of catalysts systems useful in the formation of the impact copolymer are Ziegler-Natta catalysts systems described in U.S. Pat. Nos. 4,990,479, 5,159,021 and 6,111,039.

Regardless of the method of making the ICP, the ICP useful in the present invention has a melt flow rate of from greater than 10 g/10 min in one embodiment, and less than 100 g/10 min in another embodiment, or from 1 to 100 g/10 min in one embodiment, and from 2 g/10 min to 75 g/10 min in another embodiment, and from 3 g/10 min to 50 g/10 min in another embodiment. In yet another desirable embodiment, the MFR is from 5 g/10 min to 40 g/10 min, and from 15 g/10 min to 40 g/10 min in yet another embodiment, wherein a desirable embodiment may include any combination of any upper MFR limit and any lower MFR limit described herein.

Other nonlimiting commercial examples of suitable substrate materials include polypropylene impact copolymers such as ExxonMobil PP7032E2 resin comprising 83 wt % polypropylene and 17 wt % ethylene-propylene rubber, and PP8102E3 resin comprising 78 wt % polypropylene and 22 wt % ethylene-propylene rubber, and ExxonMobil PP8114 (exterior grade) and PP8224 (interior grade) resins, all available from ExxonMobil Chemical Company (Houston, Tex.).

Finally, the substrate may be any other material that can be secured to the laminate, such as butyl rubber, natural rubber, styrenic rubbers, fiberglass, wood, glass, etched glass, aluminum in sheet or film form, steel or other metals and metal alloys, and blends thereof.

Embodiments of the substrate material of the invention may contain a nucleating agent, an additive specifically utilized to increase the rate of crystallization of the polymer as it cools from the melt as compared to the same polymer in the absence of such an additive. There are many types of nucleating agents for polypropylene, which would are suitable for inclusion in the substrate formulations of this invention. Suitable nucleating agents are disclosed by, for example, H. N. Beck in *Heterogeneous Nucleating Agents for Polypropylene Crystallization,* 11 J. Applied Poly. Sci. 673-685 (1967) and in *Heterogeneous Nucleation Studies on Polypropylene,* 21 J. Poly. Sci.: Poly. Letters 347-351 (1983). Examples of suitable nucleating agents are sodium benzoate, sodium 2,2'-methylenebis(4,6-di-tert-butylphenyl)phosphate, aluminum 2,2'-methylenebis(4,6-di-tert-butylphenyl)phosphate, dibenzylidene sorbitol, di(p-tolylidene)sorbitol, di(p-ethylbenzylidene)sorbitol, bis(3,4-dimethylbenzylidene) sorbitol, and N',N'-dicyclohexyl-2,6-naphthalenedicarboxamide, and salts of disproportionated rosin esters.

Other additives may be included in the substrate formulations or any other ionomer or tie-layer disclosed herein, as suggested by the intended uses of the materials and the knowledge and experience of the formulator. In one embodiment, included in the any layer is a primary antioxidant to deter oxidative degradation of the polymer and an acid scavenger to neutralize acid catalyst residues which may be present in the polymer to a greater or lesser extent. Examples of the former class of additives would be hindered phenolic antioxidants and hindered amine light stabilizers, examples and the application of which are well documented in the art. Examples of the later category of additives would be metal salts of weak fatty acids such as sodium, calcium, or zinc stearate and weakly basic, naturally occurring minerals such as hydrotalcite or a synthetic equivalent like DHT-4A ($Mg_{4.5}Al_2(OH)_{13}CO_3{\cdot}3.5H_2O$, Kiowa Chemical Industry Co., Ltd.). As elsewhere in this specification, these listings of possible additives are meant to be illustrative but not limiting of the choices which may be employed.

In another embodiment, a secondary antioxidant is added to the substrate to stabilize the resins to oxidative degradation during heating to which they might be subjected or during very long storage or exposure periods at somewhat elevated temperatures. Representative examples of the former, high temperature stabilizers are organic phosphorous acid esters (phosphites) such as trinonylphenol phosphite and tris(2,4-di-t-butylphenyl)phosphite, and more recently discovered agents such as distearyl, hyroxylamine and 5,7-di-t-butyl-3-(3,4-dimethylphenyl)-3H-benzofuranone. The high temperature stabilizers include distearyl thiodipropionate and other fatty esters of thiodipropionic acid. Other agents of these types, which are too numerous to list here, may likewise be utilized, but the foregoing is a representative, non-limiting list of commonly used examples.

Many other types of additives could be optionally included in the layer formulations of this invention such as lubricants, antistatic agents, slip agents, anti-blocking agents, colorants, metal deactivators, mold release agents, fillers and reinforcements, fluorescent whitening agents, biostabilizers, and others.

Laminate Formation

The tie-layer and at least one ionomer layer described above may be secured to one another by any appropriate means to form the laminate. In one embodiment, the ionomer layer is adhered to the acid polymer layer in a co-extrusion process. The co-extrusion process can include a 2, 3, 4 or more co-extruded layers. In general, the process includes first melting each material in an appropriate device and depositing or extruding these molten or semi-molten materials together through a die or dies. The various layers can be combined in the melt stage via appropriate mechanisms known in the art prior to exiting the die, or combined after exiting the die. This is followed by contacting the thus formed multi-layered laminate with a series of chill rolls and sheet conveyer. The cooled laminate is then cut to size or rolled by appropriate means.

The ionomer, acid polymer and other materials that form the laminate of the present invention can be co-extruded using conventional equipment well known in the industry. In one embodiment, the extrusion process conditions are as follows. The temperature controllers of the extruder(s) used to process the ionomer(s) for the a layer(s) are set at 180° C. to 225° C. in one embodiment (and in the examples below), yielding a final material melt temperature of 200° C. to 215° C. or higher. Desirably, the ionomer material melt temperature is greater than 200° C. in another embodiment. The temperature controllers of the extruder(s) used to process the acid polymer(s) for the b layer(s) are set for 195° C. to 225° C. in another embodiment (and in the examples below), yielding a final material melt temperature of 210° C. to 230° C. It is desirable that the viscosity of each material to be extruded be closely matched to each other for high gloss and color compatibility. This may be accomplished by blending two or more materials having dissimilar MIs, or visbreaking techniques, or other techniques known to those in the art.

In one embodiment, an extruder is used comprising a die that allows for thermal isolation and/or control of each of the materials being melted to form the multi-layer laminate. The temperature control can be achieved by any suitable means as by insulation and/or thermal cooling and/or heating elements that can be controlled by electricity, steam, oil, or other gases or liquids. Such a co-extrusion apparatus is described in, for example, U.S. Pat. Nos. 5,516,474 and 5,120,484, and references cited therein. The extruder/die may have separate extrusion layers within the die, and having a means by which to heat the material to a temperature higher than the melt temperature going into the die. For example, the die temperature may generally be at from 150° C. to 200° C., while one or more of the material streams that will make up the laminate may be further heated to from 230° C. to 270° C. Heating the layer having the pigment in this manner is particularly desirable. This procedure improves the "flop" of the laminate, in particular when metallic pigments are used such as, for example, in an exterior automotive part.

Further, the cooling of the laminate takes place on a chill roll or rolls, and may be cooled any number of ways. In one embodiment, the cooling takes place at a chill roll temperature of from 25° C. to 75° C. In yet another embodiment, the chill rolls are at from 4° C. to 20° C. In the later embodiment, a dull finish is achieved when using a metallic pigment when the laminate is heated in the subsequent thermoforming process.

The final laminate may have any number of layers of ionomer and or tie-layer materials. Embodiments of the laminate include one layer of ionomer and one layer of an acid polymer. Another embodiment includes two layers of ionomer and one layer of an acid polymer. Yet another embodiment of the laminate includes two layers of ionomer and two layers of tie-layer material such as an acid polymer and/or blend of acid polymer and polyolefin. In yet another embodiment of the laminate, there may be two layers on ionomer and one layer an acid polymer/polyolefin blend as the tie-layer.

In one embodiment of the laminate of the invention, two layers of ionomer may be co-extruded with one layer of tie-layer material, wherein the ionomers are $Zn^{2+}$ and $Na^{+}$ salts of ethylene acrylic acid copolymers and the tie-layer material is ethylene acrylic acid terpolymer (or "EAAT"). Another embodiment includes two ionomer layers of zinc and sodium salts of ethylene acrylic acid copolymers and a tie-layer including a polypropylene/acid terpolymer blend such as, for example, a polypropylene impact copolymer present from 10 to 90 wt % in one embodiment, and from 30 to 70 wt % in another embodiment, and from 40 to 60 wt % in yet another embodiment in the blend, and EAAT present from 10 to 90 wt % in one embodiment, from 30 to 70 wt % in another embodiment, and from 40 to 60 wt % in yet another embodiment in the blend.

In yet another example of the laminate, two ionomer layers as described above may be present with one layer of tie-layer material, the tie-layer including a blend of high density polyethylene (HDPE) and EAAT. The HDPE may be present in the range from 10 to 90 wt % in one embodiment, from 25 to 75 wt % in another embodiment, and from 35 to 65 wt % in yet another embodiment, while the EAAT is present in the range from 10 to 90 wt % in one embodiment, from 25 to 75 wt % in another embodiment, and from 35 to 65 wt % in yet another embodiment.

In yet another example of the laminate, two ionomer layers may be present with one tie-layer material, wherein the tie-layer material is a blend of the following: HDPE and linear low density polyethylene (LLDPE) in a ratio of from 75/25 wt % to 85/15 wt %, blended with EAAT, the EAAT present in the tie-layer blend from 10 to 90 wt % in one embodiment, from 25 to 75 wt % in another embodiment, and from 35 to 65 wt % in yet another embodiment.

In yet another example of the laminate, two ionomer layers may be present with one tie-layer material, wherein the tie-layer material is a blend of the following: linear low density polyethylene blended with EAAT, the EAAT present in the tie-layer blend from 10 to 90 wt % in one embodiment, from 25 to 75 wt % in another embodiment, and from 35 to 65 wt % in yet another embodiment.

In yet another example of the laminate, two layers of ionomer as described above may be co-extruded with two layers of tie-layer material. Examples of this tie-layer configuration include one layer of an ethylene acrylic acid terpolymer and another layer of a blend of polypropylene and acid polymer, specifically, a polypropylene impact copolymer present from 10 to 90 wt % in one embodiment, and from 30 to 70 wt % in another embodiment, and from 40 to 60 wt % in yet another embodiment in the blend, and ethylene acrylic acid terpolymer present from 10 to 90 wt % in one embodiment, from 30 to 70 wt % in another embodiment, and from 40 to 60 wt % in yet another embodiment in the blend.

The final laminate may have any number of layers of ionomer and tie-layer materials. In one embodiment, the laminate is two layers, three in another embodiment, and four layers in yet another embodiment. In one embodiment, the ionomer layer or layers, prior to thermoforming, are from 13 to 1000 μm. In another embodiment, the pre-thermoformed ionomer layer or layers is from 25 to 380 μm. In yet another embodiment, the pre-thermoformed ionomer layer is from 200 to 380 μm. The tie-layer can be of comparable thickness ranges, making the overall thickness of the laminate from 0.1 mm to 5 mm in one embodiment, or from 0.25 to 3 mm in yet another embodiment.

In an embodiment of the laminate, the melt viscosity, or melt indexes (MI, ASTM D1238 test method, at 190° C. and 2.16 kg load) of each adjoining layer are within less than 5 dg/min of each other in one embodiment, within less than 4 dg/min of each other in another embodiment, and less than 3 dg/min from one another in yet another embodiment, and from within 1 to 4 dg/min of the layer in which it is in direct contact with during co-extrusion in another embodiment, and within 2 to 3 dg/min of one another in another embodiment.

Laminate Shaping Process

The laminate may be shaped into the profile of a desirable end use article by any suitable means known in the art. Thermoforming, vacuum forming, and blow molding are desirable embodiments of such a laminate shaping means.

Thermoforming is a process of forming at least one pliable plastic sheet into a desired shape. In an embodiment of the present invention, the laminate that is formed from the at least one ionomer layer and tie-layer are thermoformed into a desirable shape, typically the shape of the end use article. An embodiment of the thermoforming sequence is described. First, the co-extruded laminate of ionomer and acid polymer (or other tie-layer materials) is placed on a shuttle rack to hold it during heating. The shuttle rack indexes into the oven which pre-heats the film before forming. Once the film is heated, the shuttle rack indexes back to the forming tool. The film is then vacuumed onto the forming tool to hold it in place and the forming tool is closed. The forming tool can be either "male" or "female" type tools. The tool stays closed to cool the film and the tool is then opened. The shaped laminate is then removed from the tool.

Thermoforming is accomplished by vacuum, positive air pressure, plug-assisted vacuum forming, or combinations and variations of these, once the sheet of material reaches thermoforming temperatures of from 140° C. to 185° C. or higher. A pre-stretched bubble step is used, especially on large parts, to improve material distribution. In one embodiment, an articulating rack lifts the heated laminate towards a male forming tool, assisted by the application of a vacuum from orifices in the male forming tool. Once the laminate is firmly formed about the male forming tool, the thermoformed shaped laminate is then cooled, typically by blowers. Plug-assisted forming is generally used for small, deep drawn parts. Plug material, design, and timing can be critical to optimization of the process. Plugs made from insulating foam avoid premature quenching of the plastic. The plug shape is usually similar to the mold cavity, but smaller and without part detail. A round plug bottom will usually promote even material distribution and uniform side-wall thickness. For a semicrystalline polymer such as polypropylene, fast plug speeds generally provide the best material distribution in the part.

The shaped laminate is then cooled in the mold. Sufficient cooling to maintain a mold temperature of 30° C. to 65° C. is desirable. The part is below 90° C. to 100° C. before ejection in one embodiment. For the best behavior in thermoforming, the lowest melt flow rate polymers are desirable. The shaped laminate is then trimmed of excess laminate material before composite formation by securing of a substrate to the shaped laminate.

Blow molding is another suitable laminate forming means, which includes injection blow molding, multi-layer blow molding, extrusion blow molding, and stretch blow molding, and is especially suitable for substantially closed or hollow objects, such as, for example, gas tanks and other fluid containers. Blow molding is described in more detail in, for example, CONCISE ENCYCLOPEDIA OF POLYMER SCIENCE AND ENGINEERING 90-92 (Jacqueline I. Kroschwitz, ed., John Wiley & Sons 1990).

Typical process conditions for producing a laminate having a tie-layer comprising multiple layers, and with quality color and high gloss using blow molding is outlined below:

The co-extrusion extruder temperatures are as follows in one embodiment:

- Ionomer layers: 180° C.-260° C. with a final material melt temp. of 205° C.-250° C.;
- Tie-layers: 205° C.-255° C. with a final material melt temp. of 193° C.-250° C.
- Backing layers (when present): 195° C.-250° C. with a final material temp. of 210° C. to 245° C.

Head Temperature: 195° C.-250° C.

Mold temperature: 10° C.-65° C.

Feed Blocks: 150° C.-250° C.

Air Pressure: 410 kPa-1,100 kPa.

A final part thickness of between 1.02 mm-7.4 mm is typical for this application. Layer thicknesses are as follows: exterior layer, clear: 0.13 mm-0.38 mm; second layer, pigmented: 0.13 mm-0.64 mm; third layer, pigmented or clear: 0.025 mm-0.25 mm; forth layer, clear or pigmented: 0.25 mm-1.02 mm; substrate, clear or pigmented: 2.03 mm-5.6 mm.

To achieve a high gloss level on the finished part the mold is polished to an SPI 1 or higher "Mirror" finish in one embodiment. This finish is best achieved by using a diamond finishing polish at a 1400 grit or higher.

In yet another embodiment of the laminate formation and shaping process, profile co-extrusion can be used. The profile co-extrusion process parameters are as above for the blow molding process, except the die temperatures (dual zone top and bottom) range from 150° C.-235° C., the feed blocks are from 90° C.-250° C., and the water cooling tank temperatures are from 10° C.-40° C.

Composite Formation

Formation of the composite comprises securing, by any suitable means known to those skilled in the art, a substrate material to the laminate, desirably such that the substrate is secured in a uniform and continuous manner to the tie-layer side of the shaped laminate. Examples of suitable securing means for securing the substrate to the shaped laminate include blow molding, rotational molding, slush molding, transfer molding, wet lay-up or contact molding, cast molding, cold forming matched-die molding, injection molding, spray techniques, profile co-extrusion, placement of adhesives between the substrate and shaped laminate, or combinations thereof. In one embodiment, after the laminate shaping process step, the composite of the shaped laminate and substrate is formed by an injection molding process or spray process, or other suitable process. In a desirable embodiment, injection molding is used.

One embodiment of an injection molding process is described as follows. The shaped laminate is placed into the injection molding tool. The mold is closed and the substrate material is injected into the mold. The substrate material has a melt temperature between 200° C. and 300° C. in one embodiment, and from 215° C. and 250° C. and is injected into the mold at an injection speed of between 2 and 10 seconds to obtain the desired adhesion to the laminate in one embodiment. After injection, the material is packed or held at a predetermined time and pressure to make the part dimensionally and aesthetically correct. Typical time periods are from 5 to 25 seconds and pressures from 1,380 kPa to 10,400 kPa. The mold is cooled between 10° C. and 70° C. to cool the substrate. The temperature will depend on the desired gloss and appearance desired. Typical cooling time is from 10 to 30 seconds, depending on part on the thickness. Finally, the mold is opened and the shaped composite article ejected.

As mentioned above, suitable substrates for injection molding include various grades of polyethylene (PE) and polypropylene (PP), and impact copolymers (ICP), plastomers, polycarbonates, styrenic and acrylonitrile-styrenic copolymers (ABS), and blends thereof, as shown in Tables 1-4. In one embodiment, high density polyethylene is injection molded into the thermoformed laminates described above. In particular, high density polyethylene may be injection molded into a formed laminate, the laminate being two layers of ionomer material and one tie-layer containing a blend of a EAAT with a LLDPE and or LDPE. In another embodiment, polypropylene is injection molded into a mold having the shaped laminate, thus securing the laminate to the substrate and forming a shaped composite.

Several embodiments of the lamination and composite-formation steps are described in FIGS. 4 through 9. FIG. 4 refers to one embodiment of the lamination process of the invention, wherein four (4) layers are first co-extruded, the first layer that will ultimately be the exterior of the formed composite article—or the "exterior layer"—being a clear or non-pigmented ionomer layer, the second layer is a pigmented ionomer, and two layers comprising the tie-layer, the first layer being a blend of an acid terpolymer and a polypropylene ICP, and the second, or "backing layer" also being a blend of an acid terpolymer and a polypropylene impact copolymer. These materials are co-extruded in a multilayer die, then passed over at least two chill rolls and a sheet conveyor. This cooled sheet is then cut to size and/or rolled. Sheets taken from this cooled material can then be placed on a thermoforming rack and thermoformed, followed by cooling of the shaped laminate, and trimming of the cooled shaped laminate to prepare it for use in forming the shaped composite article.

FIG. 5 is a flow diagram of one embodiment of the co-extrusion process followed by thermoforming and injection molding. Four (4) layers are first co-extruded. The first layer that will ultimately be the exterior of the formed composite article—or the "exterior layer"—is a clear layer or non-pigmented ionomer, the second layer is a pigmented ionomer, and two layers comprising the tie-layer, the first layer being a blend of an acid terpolymer and a polypropylene ICP, and the second, or "backing layer" also being a blend of an acid terpolymer and a polypropylene impact copolymer. These materials are co-extruded in a multilayer die, then passed over at least two chill rolls and a sheet conveyor. This cooled sheet is then cut to size and/or rolled. Sheets taken from this cooled material can then be placed on a thermoforming rack and thermoformed, followed by cooling of the shaped laminate, and trimming of the cooled shaped laminate to prepare it for use in forming the shaped composite article. This trimmed, shaped laminate is then placed into an injection molding tool. The shaped laminate is such that it substantially conforms to the shape injection molding tool. At least one layer of the tie-layer, in particular, the backing layer, is exposed in order to allow the tie-layer to be secured to the substrate material to be injected. Hence, the substrate material in molten form is then injected into the tool, being secured to the laminate and forming a cohesive unit with the shaped laminate. The part that results is a shaped composite article having the desired shape and geometry of the end use article.

Figure 6:
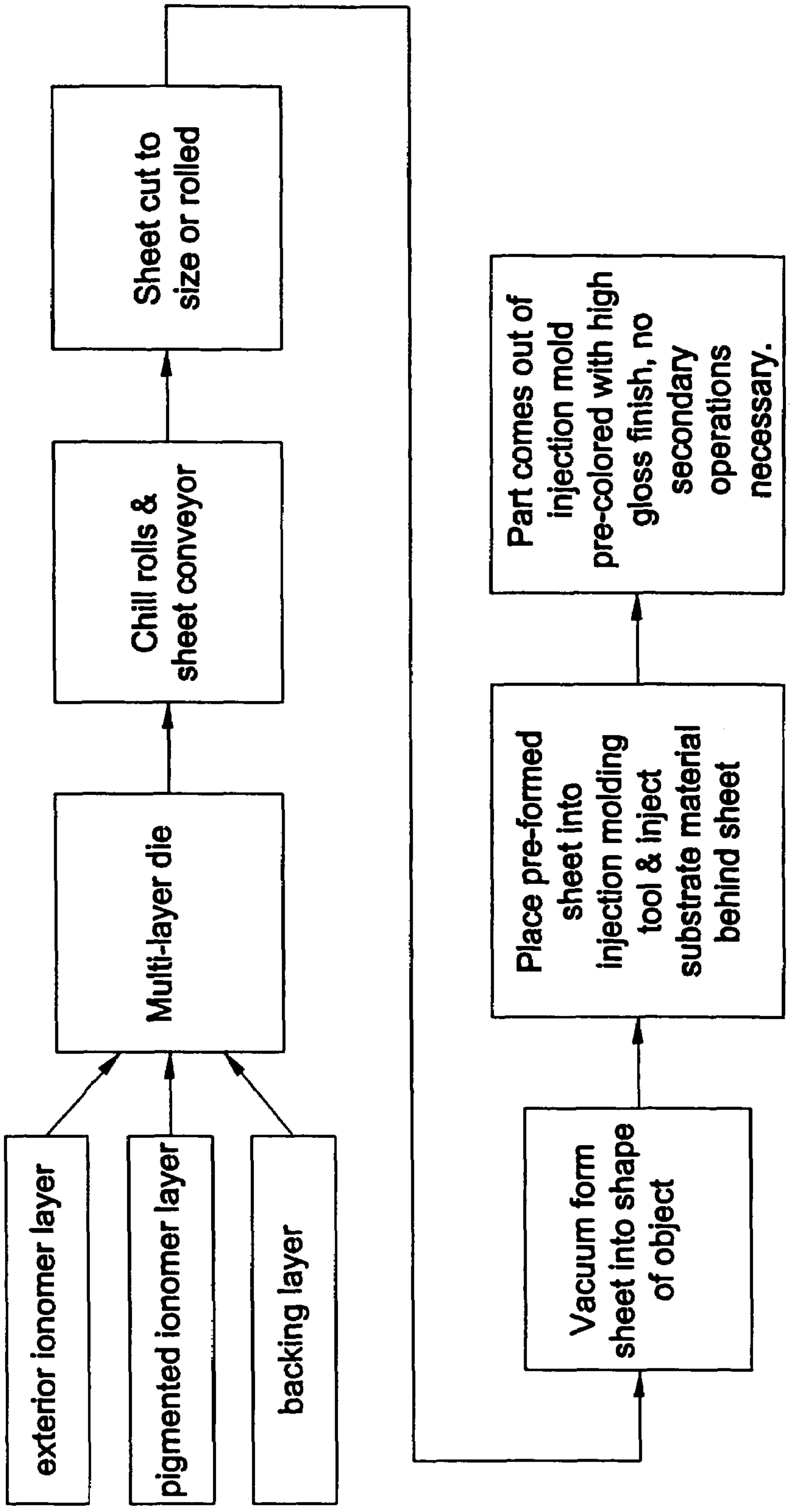
FIG. 6 is a process flow chart of another embodiment of a co-extrusion/injection molding embodiment of the invention.

In yet another embodiment in forming the shaped laminate/composite article, FIG. 6 outlines a process securing two ionomer layers and one tie-layer material together. In this embodiment, the exterior ionomer layer is a clear layer not containing a pigment, which is co-extruded and secured to a second pigmented ionomer layer. The 2- or more layers of ionomer, the exterior layer being clear, enhances the perception of "depth" in the finished shaped laminate and composite article, and gives an aesthetically pleasing appearance, especially in such applications as exterior automotive parts.

Further in the embodiment in FIG. 6 is a co-extruded tie-layer that is secured to the pigmented ionomer layer. The material used to make the tie-layer here, and in other embodiments of the tie-layer, may be adjusted based on the identity of the substrate material to be used to make the finished article. For example, if the substrate material is to be a polymer or polymer blend of substantially polypropylene, it is desirable for the tie-layer, or at least the backing layer of the tie-layer, to be a blend of an acid terpolymer and a polypropylene-based material such as a polypropylene ICP. By "substantially polypropylene", it is meant that the material, blend or otherwise, contain at least 50 wt % propylene derived units in one embodiment, and at least 60 wt % propylene derived units in another embodiment, by weight of the substrate material or material blend. Likewise in the embodiment of FIG. 6, if the substrate material is to be substantially polyethylene, it is desirable that the tie-layer, or at least the backing layer of the tie-layer, be a blend of an acid terpolymer and a polyethylene-based material such as a plastomer or other polyethylene.

These materials are co-extruded in a multilayer die, then passed over at least two chill rolls and a sheet conveyor. This cooled sheet is then cut to size and/or rolled. Sheets taken from this cooled material can then be placed on a thermoforming rack and thermoformed, followed by cooling of the shaped laminate, and trimming of the cooled shaped laminate to prepare it for us in forming the shaped composite article. This trimmed shaped laminate is then placed into an injection molding tool that substantially conforms to the shape of the shaped laminate, exposing at least one layer of the tie-layer, in particular, the backing layer, in order to allow the tie-layer to be secured to the substrate material to be injected. Hence, the substrate material in molten form is then injected into the tool, forming a cohesive unit with the shaped laminate. The part that results is a shaped composite article having the desired shape and geometry of the end use article.

Figure 7:
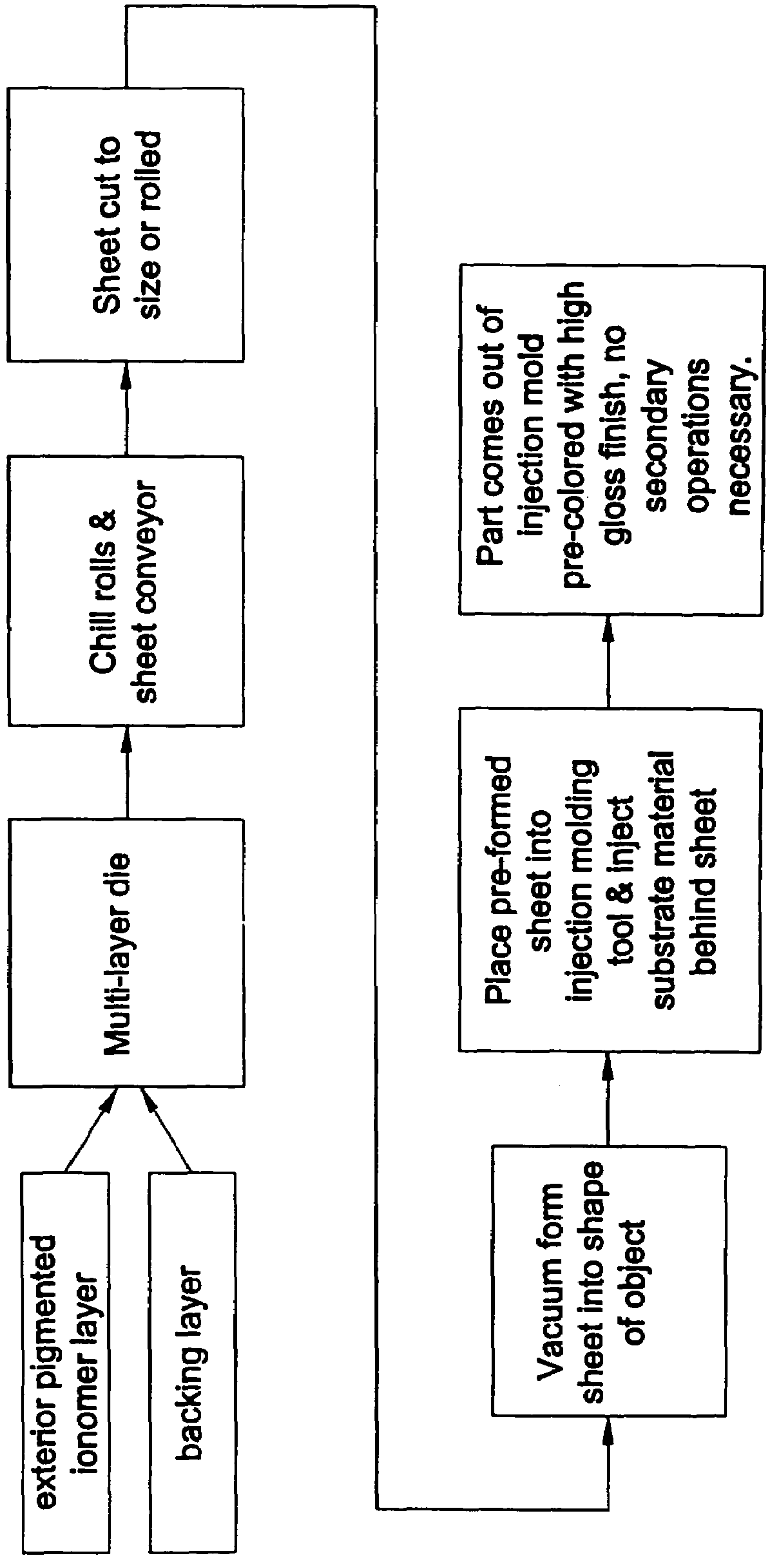
FIG. 7 is a process flow chart of yet another embodiment of a co-extrusion/injection molding embodiment of the invention.
Figure 8:
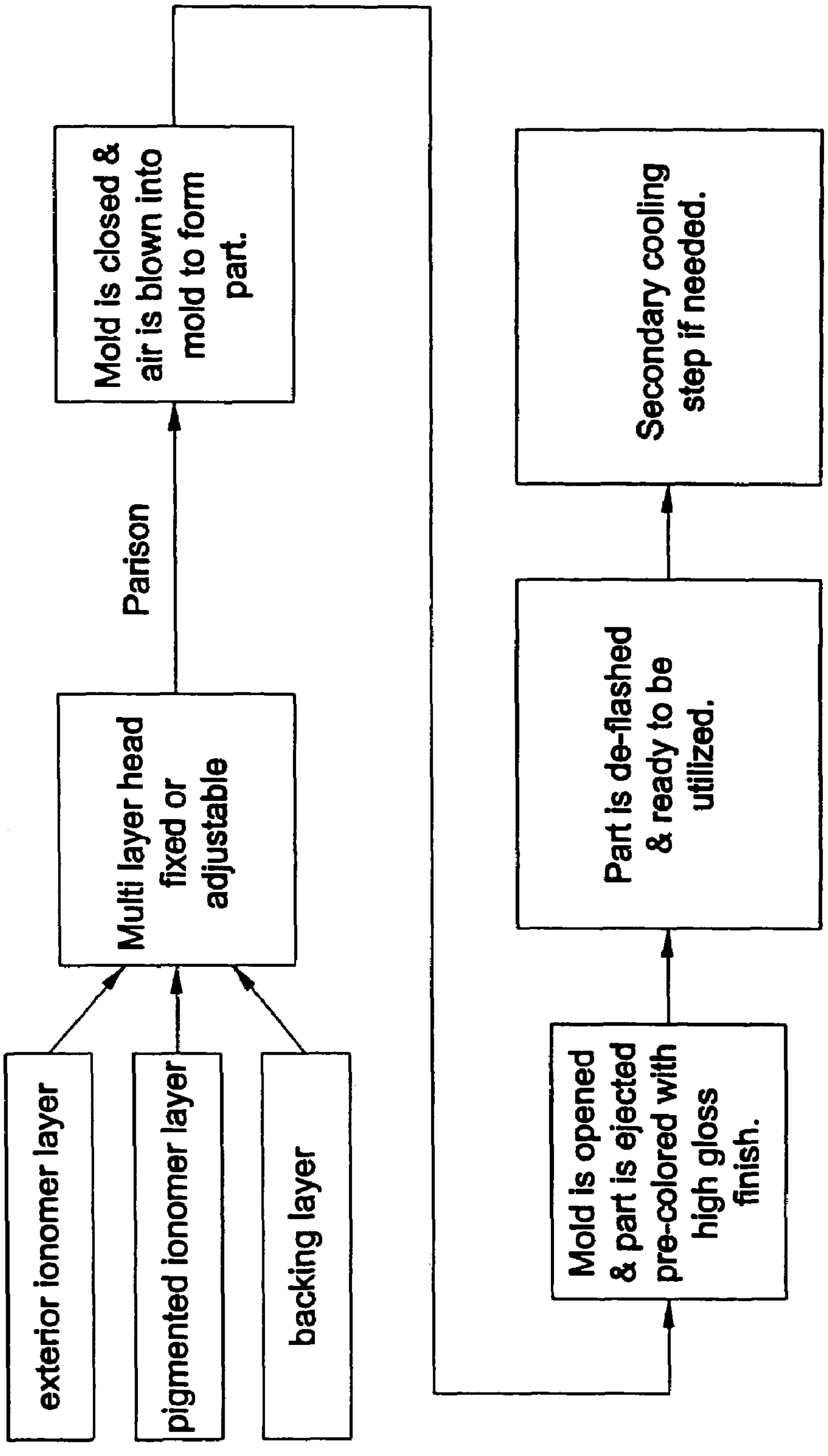
FIG. 8 is a process flow chart of a co-extrusion/blow molded embodiment of the invention.
Figure 9:
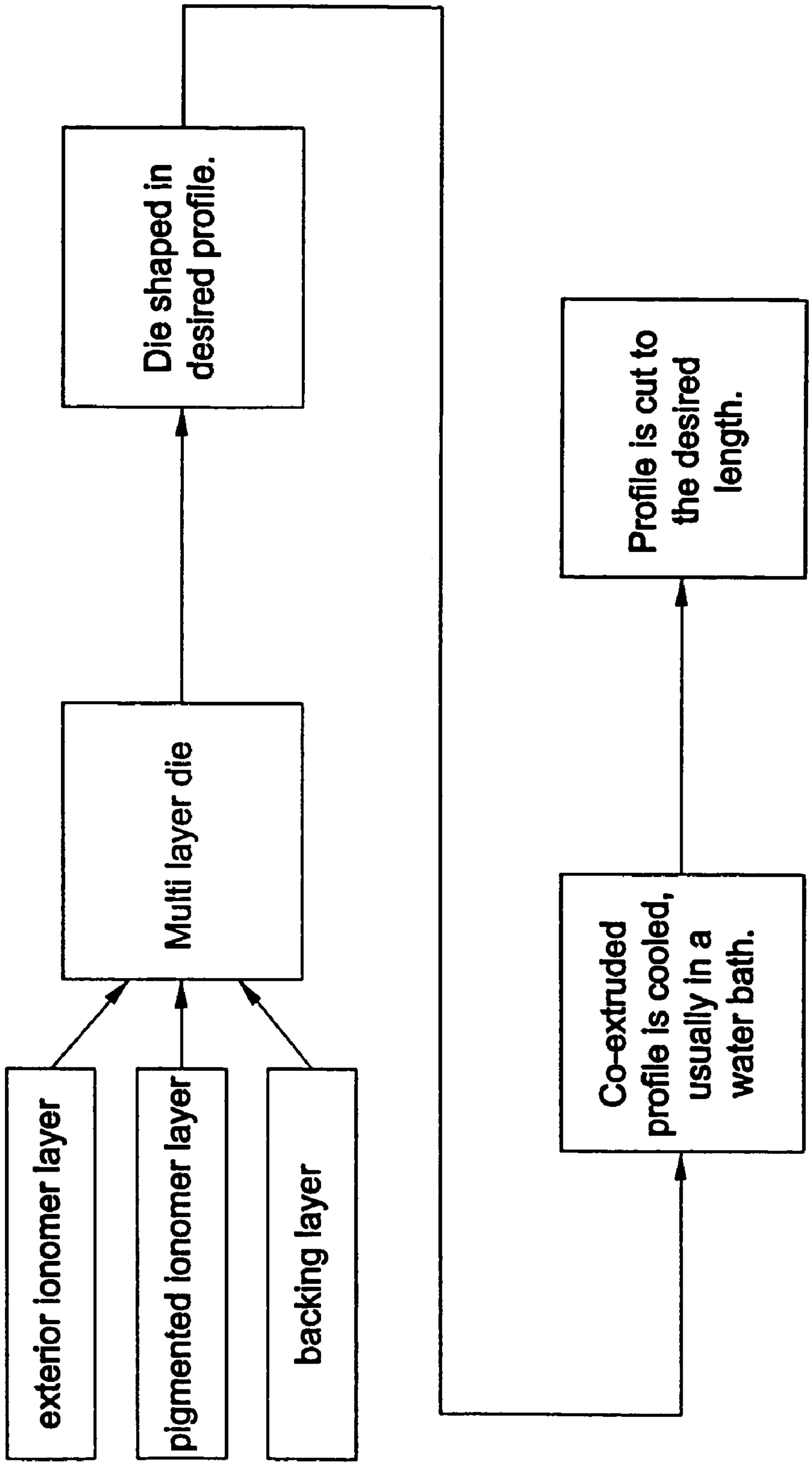
FIG. 9 is a process flow chart of a profile co-extrusion embodiment of the invention.

FIG. 7 is a flow chart of yet another embodiment of the process in making a shaped laminate and composite article. This embodiment includes only one layer of ionomer and one layer of tie-layer material. This arrangement is useful in an article where it is not necessary to match the laminate to a painted surface, whereas the embodiments represented in FIGS. 5 and 6 would be more useful in an article where matching existing painted surfaces would be of concern. In the present embodiment, the one ionomer layer is the external layer, and is pigmented. The tie-layer material can be described as for the embodiment represented in FIG. 6 above. The other operations of lamination, cooling, cutting and injection molding are as described above.

An embodiment of the co-extrusion process operational parameters for producing a laminate with high gloss and high color quality is as follows. The co-extrusion process temperatures for the ionomer layers are from 180° C. to 230° C. in one embodiment, and from 180° C. to 230° C. in another embodiment, with a final material melt temperature (the temperature at which the material is extruded from the die) of from greater than 200° C. in one embodiment, from 200° C. to 220° C. in another embodiment, and from 205° C. to 215° C. in another embodiment. The co-extrusion process temperatures for the tie-layers is from 200° C. to 255° C. in one embodiment, and from 205° C. to 255° C. in another embodiment, with a final material melt temperature of 190° C. to 250° C. in one embodiment, and from 190° C. to 250° C. in yet another embodiment. For the backing layer of the tie-layer, the extruder temperature is from 195° C. to 230° C., with a final material temperature of from 210° C. to 220° C. The die temperature, dual zone top and bottom, is between 195° C. and 235° C. in one embodiment. The chill roll temperatures, typically two to three rolls, are between 10° C. and 71° C.

Desirably, the MI of each adjacent layer in the laminate (ionomers, acid terpolymers, and blends thereof) is within less than 5 dg/min of each other in one embodiment, and within less than 4 dg/min in another embodiment, and within less than 3 dg/min in yet another embodiment, and within between 0.1 dg/min and 5 dg/min of each other in one embodiment, and within between 0.2 dg/min and 4 dg/min in yet another embodiment, a desirable range being any combination of any upper MI limit with any lower MI limit described herein.

In an embodiment of the thermoforming process, the oven temperature is between 160° C. and 195° C., the time in the oven between 10 and 20 seconds, and the die temperature, typically a male die, between 10° C. and 71° C. The tie-layer or backing layer faces the heat source of the oven in one embodiment. The final thickness of the cooled (room temperature), shaped laminate is from 10 μm to 6000 μm in one embodiment, from 200 μm to 6000 μm in another embodiment, and from 250 μm to 3000 μm in yet another embodiment, and from 500 μm to 1550 μm in yet another embodiment, a desirable range being any combination of any upper thickness limit with any lower thickness limit.

In an embodiment of the injection molding process, wherein a substrate material is injection molded into a tool including the shaped laminate, the melt temperature of the substrate material is between 230° C. and 255° C. in one embodiment, and between 235° C. and 250° C. in another embodiment, the fill time from 2 to 10 seconds in one embodiment, from 2 to 8 seconds in another embodiment, and a tool temperature of from 25° C. to 65° C. in one embodiment, and from 27° C. and 60° C. in another embodiment. In a desirable embodiment, the substrate material is at a temperature that is hot enough to melt the tie-layer material or backing layer to achieve adhesion between the layers.

In yet another embodiment of the invention, the laminate may be secured to a substrate material using a blow molding operation. Blow molding is particularly useful in such applications as for making closed articles such as fuel tanks and other fluid containers, playground equipment, outdoor furniture and small enclosed structures. In one embodiment of this process, as outlined in FIG. 8, two layers of ionomer, one external clear layer (non-pigmented) and a pigmented layer, are co-extruded with a tie-layer material that can be a blend of an acid terpolymer and another material, such as the material to be used as the substrate, described above. The co-extrusion takes place through a multi-layer head, followed by placement of the uncooled laminate into a parison in the mold. The mold, with either male or female patterns inside, is then closed and air is blown into the mold to form the part. The shaped laminate inside the mold can then be subjected to injection of substrate materials to form the composite article.

It will be understood by those skilled in the art that the steps outlined above may be varied, depending upon the desired result. For example, the co-extruded sheet of layered ionomer and tie-layer may be directly thermoformed or blow molded without cooling, thus skipping a cooling step. Other parameters may be varied as well in order to achieve a finished composite article having desirable features.

An embodiment of the invention can thus be described as a laminate comprising a tie-layer having a first side and a second side, wherein the first side is secured to at least one layer of ionomer, and wherein the tie-layer comprises one or more layers of material selected from acid polymers, soft ionomers, polyolefins, or blends thereof. The ionomer layer may have certain desirable characteristics, for example the at least one ionomer layer may have a melt temperature of at greater than 70° C., and the at least one ionomer layer may comprise two ionomer layers in a further embodiment. At least one layer is pigmented, and the first or a ionomer layer (FIG. 1) may be clear or non-pigmented. In a further embodiment, the melt indexes of adjacent laminate layers are within less than 4 dg/min of one another.

Further, the laminate may include two ionomer layers secured to a tie-layer, the tie-layer comprising one layer of material selected from acid terpolymers, polypropylene, polyethylene, and blends thereof. The polyolefin may be selected from polyethylene polymers, polyethylene copolymers, polypropylene polymers, polypropylene copolymers, polypropylene impact copolymer and a blend of polypropylene impact copolymer and ethylene plastomer, and mixtures thereof. The polyolefin used in the tie-layer may have a 1% secant flexural modulus of greater than 500 MPa in one embodiment, and a 1% secant flexural modulus of greater than 200 MPa in another embodiment.

In one embodiment, the polyolefin is present in the at least one tie-layer from 30 wt % to 70 wt %, and from 40 wt % to 60 wt % in another embodiment. In yet another embodiment, the at least one tie-layer material comprises a blend of an acid terpolymer and a polypropylene, and the at least one tie-layer material comprises a blend of acid terpolymer and a polyethylene in another embodiment, and the at least one tie-layer material comprises a blend of acid terpolymer, linear low density polyethylene, and high density polyethylene in yet another embodiment. Further, tie-layer may comprise two layers of material secured to one another, wherein a first layer is secured to the at least one ionomer.

The laminate may be formed by any suitable technique such as co-extrusion, and may be shaped to form the shape of an article. The laminate may be shaped by any suitable technique as by thermoforming or blow molding. The laminate may then be used further to form an article. In one embodiment, the article is selected from appliance parts, automotive parts, and sporting equipment parts, and in another embodiment the article is selected from a bumper, dashboard, interior trim, fuel tank, body panel, boat hull, airbag door, and automotive door panels.

The invention may also be described as a composite comprising a tie-layer having a first side and a second side, wherein the first side is secured to at least one layer of ionomer, and the second side is secured to a substrate; and wherein the tie-layer comprises one or more layers of material selected from acid polymers, soft ionomers, polyolefins, or blends thereof. The at least one ionomer layer may have certain desirable characteristics, for example the at least one ionomer layer may have a melt temperature of at greater than 70° C., and the at least one ionomer layer may comprise two ionomer layers in a further embodiment. At least one layer is pigmented, and the first or a ionomer layer (FIG. 1) may be clear or non-pigmented. In a further embodiment, the melt indexes of laminate layers are within less than 4 dg/min of one another.

Further, the laminate may include two ionomer layers secured to a tie-layer, the tie-layer comprising one layer of material selected from acid terpolymers, polypropylene, polyethylene, and blends thereof. The polyolefin may be selected from polyethylene polymers; polyethylene copolymers, polypropylene polymers, polypropylene copolymers, polypropylene impact copolymer and a blend of polypropylene impact copolymer and ethylene plastomer, and mixtures thereof. The polyolefin used in the tie-layer may have a 1% secant flexural modulus of greater than 500 MPa in one embodiment, and a 1% secant flexural modulus of greater than 200 MPa in another embodiment.

In one embodiment, the polyolefin is present in the at least one tie-layer from 30 wt % to 70 wt %, and from 40 wt % to 60 wt % in another embodiment. In yet another embodiment, the at least one tie-layer material comprises a blend of an acid terpolymer and a polypropylene, and the at least one tie-layer material comprises a blend of acid terpolymer and a polyethylene in another embodiment, and the at least one tie-layer material comprises a blend of acid terpolymer, linear low density polyethylene, and high density polyethylene in yet another embodiment. Further, tie-layer may comprise two layers of material secured to one another, wherein a first layer is secured to the at least one ionomer.

The laminate may be formed by any suitable technique such as co-extrusion, and may be shaped to form the shape of an article. The shaping can be performed by any suitable technique such as thermoforming or blow molding. Finally, the substrate may be secured to the laminate by any suitable technique such as injection molding. The thus formed composite article may then be used to make any number of articles. In one embodiment, the article is selected from appliance parts, automotive parts, and sporting equipment parts, and in another embodiment the article is selected from a bumper, dashboard, interior trim, fuel tank, body panel, boat hull, airbag door, and automotive door panels.

In another embodiment, the invention is a composite article including at least one layer of ionomer material, a tie-layer securable to a substrate material, and a substrate material secured to the tie-layer; the tie layer comprising at least one backing layer secured to the substrate; and wherein the backing layer comprises a blend of at least one acid polymer and at least one substrate material. The at least one ionomer layer may further include an external layer and a second layer that is secured to the tie-layer. The external ionomer layer is desirably clear or non-pigmented, and be at least 100 μm thick. The substrate material present in the tie-layer, or that makes up the substrate that is secured to the laminate, may have a 1% secant flexural modulus of greater than 100 MPa. The substrate material may be selected from EPDM (ethylene-propylene-diene monomer), EP (ethylene-propylene rubber), acrylonitrile-butadiene-styrene terpolymer, acetal polymer, acrylic polymers, cellulosics, fluoroplastics, nylon and other polyamides, polyamide-imide, polycarbonate, polyester, polyetheretherketone, polyetherimide, polyethylene, polyimide, polyphenylene, polyphenylene sulfide, plastomer, polypropylene, polypropylene impact copolymers, polystyrene, polysulfone, polyurethane, polyvinyl chloride, and foams of such materials, as well as blends of these materials.

Composite Articles

The laminate of the present invention can be used as a thermoformable sheet wherein the substrate is secured to the shaped laminate, thus forming a composite article. Various types of substrate materials can be used to form highly desirable articles. The laminate can be used with plastic substrates such as homopolymers, copolymers, impact copolymers, random copolymers, as described above, or foams of any of these. Specifically, non-limiting examples of articles in which the present invention can be incorporated are the following: vehicle parts, especially interior and exterior automotive parts such as bumpers and grills, deck lids, rocker panels, body panels, fenders, doors, hoods, mirror housings, wheel covers, trim, pillar trim, dash boards, seat covers, instrument panels, cup and personal containers and holders, and parts for All Terrain Vehicles (ATVs), snowmobiles, boats, jet skis, and/or motorcycles such as fuel tanks, seat covers, body chassis, hulls, and other minor components of any 2, 4 or more wheeled vehicles.

Other articles can be made from the laminates and composites of the invention, for example: counter tops, laminated surface counter tops, sinks and sink liners, tub and showers and liners for tubs and showers, pool liners/covers/boat covers, boat sails, cable jacketing, marine boat hulls/canoe interior and exterior, luggage, clothing/fabric (combined with non-wovens), tent material, GORETEX, Gamma-radiation resistant applications, electronics housing (TV's, VCR's and computers), a wood replacement for decks and other outdoor building materials, prefab buildings, synthetic marble panels for construction, wall covering, hopper cars, floor coating, polymer/wood composites, vinyl tile, bath/shower/toilet applications and translucent glass replacement, sidings, lawn/outdoor furniture, appliance exterior and interior components such as in refrigerators, clothing or dish washing machines, etc., children's toys, reflective signage and other reflective articles on roads and clothing, sporting equipment such as snowboards, surfboards, skis, scooters, wheels on in-line skates, CD's for scratch resistance, stadium seats, aerospace reentry shields, plastic paper goods, sports helmets, plastic microwaveable cookware, and other applications for coating plastics and metal where a dull or highly glossy and scratch resistant surface is desirable, while not being subject to algae/discoloration.

Test Methods

Melt Flow Rate (MFR) or Melt Index (MI). Melt flow rate is measured according to ASTM D1238 test method, at 230° C. and 2.16 kg load, and is expressed as dg/min or g/10 min. The melt index is measured according to ASTM D1238 test method, at 190° C. and 2.16 kg load, and is expressed as dg/min or g/10 min.

Peak Melting Temperature. The peak melting temperature (Tm, second melt) of the polymer was measured by using DuPont Instruments 912 differential scanning calorimeter (DSC) which is equipped with the standard numerical analysis software. The area under the melting peak represents the enthalpy of melt and is reported in Joules per gram (J/g). Standard procedure involved equilibrating the sample at 0° C., increasing the temperature at a rate of 10° C./min. to 200° C. (first melt).

Flexural Modulus. The flexural modulus is obtained according to ASTM D790, with a crosshead speed of 1.27 mm/min, and a support span of 50.8 mm, using an Instron machine.

90° Adhesion Tesi. This was done per ExxonMobil Chemical Company method. First, a cut is made through the laminate to the substrate in an "X" pattern. Second, the substrate plaque is folded on the previously scored "X" pattern, the fold being toward the substrate. Third, insert a razor under the laminate (if possible) and lift up the razor. Finally, if a corner of the laminate is lifted, pull at an angle of 90°. The results of these tests are shown in Tables 2-4 as "Good", which means that there was no loss or only a very small amount of loss of adhesion between the substrate and laminate or between laminate layers, and "Poor", which means that there was loss or substantial loss of adhesion between either the substrate and laminate or between laminate layers. A rating of "Fair" means that there was some intermediate level of adhesion loss.

Instrumented Impact. The instrumented impact strength is measured by ASTM D3763 using a Dynatup Model 8250. A drop weight of 25 pounds (111 N) and a speed of 5 and 15 miles per hour (133 to 400 meters/min) at the indicated temperature are used to measure the failure mode and the total energy. The drop weight is adjusted such that the velocity slowdown is less than 20%.

Failure Mode. The failure mode is defined as ductile (D) if the load vs. displacement curve is symmetric and there are no radial cracks in the sample and the tup pierces through the sample. The ductile-brittle (DB) failure mode is defined as the mode where on the load-displacement curve, the load goes through the maximum, and rapidly decreases to zero and there are radial cracks in the sample. And, brittle-ductile (BD) failure mode is defined as the condition where in the load vs. displacement curve, displacement curve, the load rapidly decreases and the sample breaks into multiple pieces. The desirable failure mode is completely ductile at the specified temperatures.

Other test methods include: FLTMBN108-13, which is a FORD Laboratory Test method for scratch resistance. The scratch rating is from 0.1 to 5, wherein 1 is not scratch line at all, and 5 is severe scratch lines. SAEJ400 is a Recommended Practice laboratory procedure for testing and evaluating the resistance of surface coatings to chipping by gravel impact. The results are expressed by the Method II rating system by visual comparison to the SAE Chipping Rating Standards, wherein a number from 10 to 0 indicates the number of chips of each size and a rating letter of A through D which designates the sizes of the corresponding chips. The number category is depicted below:

| Rating Number | Number of Chips |
|---|---|
| 10 | 0 |
| 9 | 1 |
| 8 | 2-4 |
| 7 | 5-9 |
| 6 | 10-24 |
| 5 | 25-49 |
| 4 | 50-74 |
| 3 | 75-99 |
| 2 | 100-149 |
| 1 | 150-250 |
| 0 | >250 |

The letter designation for the SAE J400 test is as follows, wherein the size of the chips is expressed as a dimension depending upon the type chip: flaking, fracturing or cut through/gouge:

| Rating Letter | Size of Chips |
|---|---|
| A | <1 mm |
| B | 1-3 mm |
| C | 3-6 mm |
| D | >6 mm |

The GN 9911P test method is a scuff resistance test for painted plastics from General Motors Engineering Standards. The results are expressed in terms of the percent of the paint removed (sum of arcs with paint removed/360×100). Finally, the LP463PB-10-01 and LP463PB-15-01 tests are Chrysler Corporation Test procedures for adhesion and toughness, wherein an "X" shape is cut using a razor into the film or coating of a substrate surface, followed by the application of a pressure sensitive tape applied to the cut area and removal of the tape to test adhesion of the coat. The results are reported on a peel performance scale, wherein 5B is no peeling or removal of the coating (or laminated layers in this invention), 4A is describes trace peeling or removal along incisions, 3A describes jagged removal along incisions up to 1.6 mm on either side, 2A describes jagged removal along most of the incisions up to 3.2 mm on either side, 1A describes removal from most of the area of the "X" under the tape, and 0A is removal beyond the area of the "X".

EXAMPLES

All examples 1-47 were co-extruded sheets made on either a 3 or 4 layer co-extrusion machine. All 3 layer examples were produced on a Battenfeld Glouster co-extruder machine. All 4 layer examples were produced at MAYCO Plastics on a HPM co-extruder machine. Each example comprises the formulation as described in the Tables, wherein each formulation may be tested for different properties.

The materials used to make all third and fourth layers were pre-compounded at ExxonMobil Chemical Baytown Polymers Center in Baytown, Texas. Pre-compounding was necessary due to the above mentioned extrusion equipment not having the proper screw design to adequately mix the polypropylene and polyethylene/acid terpolymer blends while processing sheet. The tie-layer materials should be adequately mixed to provide the necessary bond between the laminate and substrate.

Americhem Corp in Cuyahoga Fall, Ohio, and A. Schulman Corp. in Birmingham, Mich. provided color pigmentation for the trials. Colors used for the trials were DCX (DaimlerChrysler) approved automotive colors white, black, red, and silver metallic. Pigmentation was provided in a concentrated pellet form with a blend ratio of 25:1.

General processing parameter details for each co-extruded laminate examples are provided in the previously mentioned process sections on co-extrusion, thermal forming, and injection molding.

During the co-extrusion trials, the various tie-layers and ionomers were evaluated and noted as to the ease of processability to produce a 3 or 4 layer laminate that had the desired gloss level and color. Compatibility of the various layers' (ionomers', tie-layers') viscosities to one another in the co-extrusion process improves the final appearance of the sheet. Large viscosity differences between (greater than 15 dg/min; 190/2.16) layers produced laminates with poor gloss level, uneven surfaces, poor color depth and dispersion, large variation in sheet thickness, and areas were layers were even missing. Changes to the third and fourth layers were made based on the compatibility to the ionomer layers. The melt viscosity of each layer was within 2 and 3 MI units (dg/min) of each other. Composites with the desired appearance and adhesion were in the range of 2 and 5 MI units (dg/min), such as Examples 1-4.

Adhesion between layers was checked during and after 24 hrs for each composition using the ExxonMobil modified 90° Adhesion Test (described above). Layer composition (thickness) was adjusted accordingly if adequate adhesion was not present during the trials (not enough tie-layer material). Adhesion testing after 24 hrs. was done to make sure that there was adequate adhesion to withstand the stresses induced during the natural shrinkage that occurs during the early aging of the composite. It has been shown through testing that good adhesion may be present initially, but significant adhesion loss can occur during aging (or annealing) of the composite even for a relatively short period of time such as 24 hrs.

Impact testing of the sheet was done on 4" (102 mm) diameter impact disk molded with ExxonMobil PP8224 as a substrate material. Examples of the laminate were placed in the injection molding disk tool, substrate material was injection molded behind the sheet, cooled, and ejected from the mold. The disks were then tested on a Dynatup instrumented impact tester at −30° C. at 15 mph (400 m/min).

The results of Examples 1-5 in Table 2 show that blends of an acid terpolymer and impact copolymer work best as the portion of the tie-layer (layer 4 in these Examples) that is secured to polyethylene or polypropylene substrates. Further, these Examples shown that having a two layer tie-layer works well with a polypropylene substrate, as in Examples 2 through 4. Adhesion performance using the acid terpolymer alone as a tie-layer with polypropylene as the substrate was not as good as when polyethylene was the substrate.

The results of Examples 6 through 12 in Table 3 show again that a two layer tie-layer having a blend of the acid terpolymer and a polypropylene work well. Further, these data shown that, as in Example 6, that having a tie-layer material of polypropylene (ExxonMobil PP 8102E3) that contacts the polypropylene substrate works well under the Adhesion Test. And, when there is one layer in the tie-layer such as in Examples 8-12, while there is good adhesion between the tie-layer and substrate, there is poor adhesion between the ionomer and tie-layer.

The results of Examples 13 through 20 in Table 4 show that a one layer tie-layer comprising a blend of materials creates good adhesion to a polyethylene substrate and the ionomer layers. In particular, Examples 14-19 all have tie-layers that are blends of either polypropylene or polyethylenes and an acid terpolymer. Also, Example 20 shows that the acid terpolymer alone works well with the polyethylene substrate, which is consistent with the results of Example 1 using a different grade of acid terpolymer.

Further embodiments of the invention are exemplified by examples 21-47. Many of these Examples are different tests performed on the same sample compositions as in Examples 1-20, as indicated by the composition of each sample. The process of forming each of these examples is outlined in FIGS. 4-9, and described in detail below. The co-extrusion and thermoforming (or "vacuum forming") process used in examples 21-47 is first outlined below.

Co-extrusion Process.

The co-extrusion extruder temperatures are as follows:

- Ionomer layers: 180° C.-260° C. with a final material melt temp. of 204° C.-250° C.;
- Tie-layers: 205° C.-255° C. with a final material melt temp. of 190° C.-250° C.
- Backing layers: 190° C.-250° C. with a final material temp. of 210° C. to 245° C.

Die temperature (dual zone top and bottom): 150° C.-235° C.
Feed Blocks: 150° C.-250° C.
Chill roll temperatures (3 rolls typical): 10° C.-75° C.

Desirably, material melt viscosity (MI) of each individual adjoining laminate layers is closely matched to each other, desirably within less than 4 dg/min. Large (greater than 10 dg/min) viscosity differences between layers causes variation in sheet thickness, gloss, and color due to processing incompatibility. To achieve a high gloss level on the finished part, the chromed chill rolls are polished to an SPI 1 or higher "Mirror" finish in a desirable embodiment. This finish is best achieved by using a diamond finishing polish at 1400 grit or higher. To achieve accurate control over layer thickness, final sheet thickness, and distribution of colorants (with or without metallic flakes) the die has the following features in one embodiment of the invention: Desirably, a means for heating/cooling the materials may be located between the clear and colored ionomer layers; all layers may be kept separated within the die until final existing point of die, were they are then brought together at the die nip; and the die nip is desirably fully adjustable across the full width of the sheet to allow for accurate control over final sheet thickness.

Thermoforming Process.

In the thermoforming process, the backing layer faces the heat source. Thermoforming processing temperatures are as follows:

- The oven Temperatures: 150° C.-230° C.
- Time in oven: 10-40 sec.
- Die temperature: 10° C.-71° C.

The process is pressure assisted using a pressure of from 345 to 1100 kPa, and a pressure and/or vacuum time 5 to 25 seconds. The final part thickness of the laminate is between 1.02 mm-7.4 mm. The thicknesses of each layer of the laminate are as follows: top, or exterior layer, non-pigmented: 0.13 mm-0.38 mm; second layer, pigmented: 0.13 mm-0.64 mm; third layer, clear or pigmented: 0.025 mm-0.25 mm; and fourth layer, clear or pigmented: 2.03 mm-5.59 mm.

Injection Molding Process.

The injection molding of the substrate material on the thus formed sheet or laminate for examples 1-47 is as follows:

- Melt Temperatures: 205° C.-260° C.
- Cooling Time: 10-40 sec.
- Fill time: 2-20 seconds actual, 0.5-4 in/sec (10-100 mm/sec).
- Hold/Pack Time: 5-35 sec.
- Tool temperature: 10° C.-65° C.
- Hold/Pack psi.: 1.38-10.3 MPa.

Desirably, the substrate material melt is be hot enough during molding to melt the tie-layer or backing layer material to achieve a good bond. To achieve a high gloss level on the finished part the injection mold is polished to an SPI 1 or higher "Mirror" finish in one embodiment. This finish is best achieved by using a diamond finishing polish at a 1400 grit or higher.

Example compositions are as described in Tables 5 and 6. A painted composition was tested for comparison. In this case, ExxonMobil 8224 was painted using BASF 1K paint system U04KM039C adhesion promoter, E174WM018 white base coat, and E86CM200 clear coat. The painted film build or thickness is from 0.025 mm to 0.050 mm.

All examples were co-extruded as described above, and the substrate injection molded as described above. The polypropylene-based substrate is PP8225 (ExxonMobil) in examples 21-38, while the polyethylene-based substrate is HD 6908 (ExxonMobil Chemical Company, HDPE) in examples 39-47. All compositions were tested, a separate example for each test, for Environmental Resistance and found to have excellent retention of adhesion. The first test was an Initial Adhesion test, LP-463PB-15-01, and all examples tested (21-33 and 39-47) were found to have an adhesion rating of 5B, showing no delamination. A humidity adhesion test (ASTM D1735) was also performed on the structures in examples 21-33 and 39-47 with no delamination (5B rating). An adhesion test for cycle cracking (15 cycles) under LP-463PB-15-01, Method B, was performed with no delamination of any of the examples (5B rating). A heat aging study was carried out under LP463CB-10-01 (240 hrs at 79° C.), with no delamination (5B rating). Finally, a shock test was performed on the examples 21-33 and 39-47 for 16 hours at −40° C., followed by 5 min. of water immersion at 70° C. with no delamination. The painted PP8225 substrate (as described above) showed similar results (5B rating in each test).

Further adhesion testing under ASTM D1093, or a Peel testing, was carried out, results of which are outlined in Table 7A for the PP8225 (ExxonMobil) substrate, and Table 7B for the HD 6908 (ExxonMobil) substrate. These data demonstrate that certain formulations show superior peel strength. There is improved adhesion when the melt temperature of the tie-layer is at from 230° C. to 260° C.

Scratch and Mar resistance was tested as shown in Table 8 for examples wherein a polypropylene is the substrate and example wherein a polyethylene is the substrate. These are compared to the painted polypropylene (described above). These data show that the scratch resistance is improved for both the invention example compositions relative to the painted PP8224. These data demonstrate the utility of the laminate of the invention in providing a high impact resistant article also having a high scratch resistance. In a desirable embodiment, at least one ionomer layer is a blend of IOTEK 8000 and IOTEK 7030, wherein the IOTEK 8000 is present from 60 wt % to 80 wt % of the blend.

Finally, Examples 21-33 and 39-47 were tested for impact strength under ASTM D3763 at −30° C. at 5 mph (133 m/min). These results show a ductility rating of 5 for each of the examples and the substrate alone (without the laminate attached), while the painted PP8224 substrate had a ductility of 1 (brittle).

Surprisingly, the ionomer laminate has a uniform low gloss that leads to additional uses for ionomer films heretofore not possible. Currently Painted PVC and TPO skin that is extruded and/or calanderd with grained chill rolls is used to cover such applications as automotive instrument panels, topper pads, door panels, and other interior trim components to give the final part a "Soft Leather Like Touch". It is desirable to have a uniform low gloss finish (2.0% or less) that is scratch and Mar resistant for these applications. To achieve these desired attributes it is necessary to paint currently available PVC and TPO skin material due to the following reasons: (1) Current PVC and TPO skin has low resistance to scratching and Marring; (2) Current PVC and TPO extruded skin has a non-uniform gloss level due to melt fracturing during processing that is inherent in these materials. The present invention solves these and other problems by providing a laminate suitable for a wide range of applications.

One desirable embodiment of the invention includes a 4 layer structure—two ionomer layers and two layers of tie-layer material. In another embodiment, a highly neutralized ionomer of from 40-50% neutralized, and having a melt index of 0.10-0.50 dg/min serves as the exterior layer. In yet another embodiment, desirable laminate characteristics are achieved when the chill rolls at are at less than 20° C. In yet another embodiment of the laminate and composite of the invention, the ionomer material melt temperatures (processing temperatures) of greater than 200° C. in one embodiment, and greater than 240° C. in another embodiment, and greater than 245° C. in another embodiment, and between 200° C. and 500° C. in another embodiment, and between 220° C. and 400° C. in yet another embodiment. The above conditions create a sheet with an ionomer layer that is highly oriented and stressed during the co-extrusion process. When the sheet is heated in the vacuum forming process the highly oriented/stressed ionomer layer is allowed to relax rapidly. The surface has a very uniform low gloss look with a very durable surface, thus eliminating any secondary painting process. Gloss level of sheet measured less than 2.0% gloss level and scratch/Mar resistance equal to high gloss sheet tested (see IOTEK 8000 Film testing).

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the true scope of the present invention.

Terms that are or may be trademarked in some jurisdictions are used in the description. These terms are written in all capital letters, and is understood to recognize such trademarks. For brevity, markings such as "™" or "®" have not been used, and in the tables, the terms ESCOR, ESCORENE etc, are not used in all.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

TABLE 1

Description and properties of commercially available materials

| Material | Description | Peak Melt temp. (° C.) | Melt Index or Melt Flow Rate (dg/min) | 1% Secant Flex. Modulus (MPa) [ASTM D-790] |
|---|---|---|---|---|
| IOTEK 3110 (ExxonMobil) | Na salt of ethylene acrylic acid copolymer | 94 | 1.3 (MI) | — |
| IOTEK 7030 (ExxonMobil) | Zn salt of ethylene acrylic acid copolymer | 85 | 2.5 (MI) | 155 |
| IOTEK 7510 (ExxonMobil) | Zn salt of ethylene acrylic acid copolymer | 67 | 1.2 (MI) | 35 |
| IOTEK 7520 (ExxonMobil) | Zn salt of ethylene acrylic acid copolymer | 67 | 2.0 (MI) | 30 |
| IOTEK 8000 (ExxonMobil) | Na salt of ethylene acrylic acid copolymer | 83 | 0.8 (MI) | 320 |
| EX 7010.01 | Zn and Na salt of ethylene acrylic acid copolymer | — | — | — |
| ESCOR AT 320 (ExxonMobil) | Ethylene acrylic acid terpolymer (EAAT) | 76 | 5.0 (MI) | 19 |

TABLE 1-continued

Description and properties of commercially available materials

| Material | Description | Peak Melt temp. (° C.) | Melt Index or Melt Flow Rate (dg/min) | 1% Secant Flex. Modulus (MPa) [ASTM D-790] |
|---|---|---|---|---|
| ESCOR AT 310 (ExxonMobil) | Ethylene acrylic acid terpolymer (EAAT) | 76 | 6.0 (MI) | 60 |
| ESCOR XV4.04 (ExxonMobil) | Ethylene acrylic acid terpolymer (EAAT) | 78 | 2.5 (MI) | 27 |
| PP 8102E3 (ExxonMobil) | Polypropylene impact copolymer | 162 | 2.0 (MFR) | 22930 |
| PP 8224 (ExxonMobil) | Polypropylene impact copolymer | 162 | 25 (MFR) | 1034 |
| PP 7032E2 (ExxonMobil) | Polypropylene impact copolymer | 162 | 4 (MFR) | 980 |
| ESCORENE HD 9856B (ExxonMobil) | High Density polyethylene (HDPE) | 135 | 0.43 (MI) | 1450 |
| EXCEED 357C32 (ExxonMobil) | Linear Low Density Polyethylene, metallocene catalyzed (mLLDPE) | 115 | 3.5 (MI) | — |
| ESCORENE LL 6201 (ExxonMobil) | Linear Low Density Polyethylene | 123 | 50 (MI) | 214 |
| ESCORENE HD 6908 (ExxonMobil) | High Density Polyethylene (HDPE) | 136 | 8.2 (MI) | 827 |
| FORMION 1-134 (A. Schulman) | polypropylene copolymer | — | — | — |
| MD 353D (DuPont) | PP random copolymer, 0.5 to 1 wt % maleic anhydride modified | — | 450 (MI) | — |
| MZ 203D (DuPont) | PP impact copolymer, >1 wt % maleic anhydride modified | — | 100 (MI) | — |

TABLE 2

Multilayer co-extruded film formulations for polyethylene and polypropylene substrate composites

| Example Number | Layer 1 | Layer 2 | Layer 3 (wt %/wt %) | Layer 4 (wt %/wt %) | Instrumented Impact @30° C. & 15 mph (400 m/min) | 90° Adhesion Test[1] PE[2] | PP[3] |
|---|---|---|---|---|---|---|---|
| 1 | IOTEK 8000 | IOTEK 7030 | AT320 | — | — | Good | Poor |
| 2 | IOTEK 8000 | IOTEK 7030 | AT320 | PP 8102E3/AT320 (50/50) | 5 ductile | — | Good |
| 3 | IOTEK 8000 | IOTEK 7030 | AT320 | PP 8102E3/AT320 (60/40) | 5 ductile | — | Good[4] |
| 4 | IOTEK 8000 | IOTEK 7030 | PP 8102E3/AT320 (50/50) | PP 8102E3/AT320 (60/40) | 5 ductile | — | Good |
| 5 | IOTEK 8000 | IOTEK 7030 | PP 8102E3/AT320 (60/40) | PP 8102E3/AT320 (50/50) | 5 ductile | — | Fair[5] |

[1]The test is as described in the text. "Good" means that there was no loss of adhesion between the substrate and laminate or between laminate layers. "Poor" means that there was loss of adhesion between either the substrate and laminate or between laminate layers.

[2]Polyethylene is the substrate.

[3]Polypropylene, PP 8224, is the substrate.

[4]Some separation between the 2nd and 3rd layers.

[5]Some separation between the 3rd and 4th layers.

TABLE 3

Multilayer co-extruded film formulations for polypropylene substrate composites

| Example Number | Layer 1 | Layer 2 | Layer 3[1] (wt %/wt %) | Layer 4 (wt %/wt %) | 90° Adhesion Test to PP[2] |
|---|---|---|---|---|---|
| 6 | IOTEK 8000 | IOTEK 7030 | PP 8102E3/AT320 (50/50) | PP 8102E3 | Good adhesion to PP substrate |
| 7 | IOTEK 8000 | IOTEK 7030 | PP 8102E3/AT320 (40/60) | PP 8102E3/AT320 (50/50) | Good adhesion to PP substrate |
| 8 | IOTEK 8000 | IOTEK 7030 | PP 8102E3/AT320 (67/33) | — | Poor adhesion to Ionomer, Good adhesion to PP substrate |
| 9 | IOTEK 8000 | IOTEK 7030 | PP 8102E3/AT320 (65/35) | — | Poor adhesion to Ionomer, Good adhesion to PP substrate |
| 10 | IOTEK 8000 | IOTEK 7030 | PP 8102E3/AT320 (60/40) | — | Poor adhesion to Ionomer, Good adhesion to PP substrate |
| 11 | IOTEK 8000 | IOTEK 7030 | PP 8102E3/MD353D (90/10) | — | Poor adhesion to Ionomer - Delamination, Good adhesion to PP substrate |
| 12 | IOTEK 8000 | IOTEK 7030 | PP 8102E3/MZ203D (90/10) | — | Poor adhesion to Ionomer - Delamination, Good adhesion to PP substrate |

1MD 353D and MZ2O3D are Fusabond Products from Du Pont; PP 8102E3 is ExxonMobil's PP 8102E3

AT320 is ExxonMobil's ESCOR AT320 as in Table 1.

2The test is as described in the text. "Good" means that there was no loss of adhesion between the substrate and laminate or between laminate layers. "Poor" means that there was loss of adhesion between either the substrate and laminate or between laminate layers.

TABLE 4

Multilayer co-extruded film formulations for polyethylene composites

| Example Number | Layer 1 | Layer 2 | Layer 3[1] (wt %/wt %) | 90° Adhesion Test to PE[2] |
|---|---|---|---|---|
| 13 | IOTEK 8000 | IOTEK 7030 | A1B1 (75/25) | Poor adhesion to substrate |
| 14 | IOTEK 8000 | IOTEK 7030 | A1B1+ | Good adhesion to ionomer and HD 6908 substrate |
| 15 | IOTEK 8000 | IOTEK 7030 | A2B1− | Good adhesion to ionomer and HD 6908 substrate |
| 16 | IOTEK 8000 | IOTEK 7030 | A2B1+ | Good adhesion to ionomer and HD 6908 substrate |
| 17 | IOTEK 8000 | IOTEK 7030 | A1B2− | Good adhesion to ionomer and HD 6908 substrate |
| 18 | IOTEK 8000 | IOTEK 7030 | A1B2+ | Good adhesion to ionomer and HD 6908 substrate |
| 19 | IOTEK 8000 | IOTEK 7030 | A2B2+ | Good adhesion to ionomer and HD 6908 substrate |
| 20 | IOTEK 8000 | IOTEK 7030 | B2 | Good adhesion to ionomer and HD 6908 substrate |

[1]A1: ESCORENE HD9856/ESCORENE LL 6201 (85/15 wt %); A2: EXCEED 357C32; B1: ESCOR AT320; B2: ESCOR AT310. The meaning of the "+" and "−" symbols are as follows: (+) is 65 wt % ESCOR 320 or 310; (−) is 35 wt % ESCOR AT320 or 310.

[2]The test is as described in the text. "Good" means that there was no loss of adhesion between the substrate and laminate or between laminate layers. "Poor" means that there was loss of adhesion between either the substrate and laminate or between laminate layers.

TABLE 5

Example 21-38 compositions wherein a polypropylene-based material is the substrate

| example | exterior ionomer layer | pigmented ionomer layer | first tie-layer material | second tie-layer material[3] |
|---|---|---|---|---|
| 21 | IOTEK 8000 | IOTEK 7030 | ESCOR AT320 | AT320/PP7032-E2 (50/50) |
| 22 | IOTEK 8000 | IOTEK 7030 | AT320 | AT320/PP7032-E2 (60/40) |
| 23 | IOTEK 8000 | IOTEK 7030 | AT320 | PP8102/AT320 (50/50) |
| 24 | IOTEK 8000 | IOTEK 7030 | AT320 | PP8102/AT320 (60/40) |
| 25 | IOTEK 8000 | IOTEK 7030 | PP8102/AT320 (50/50) | PP8102/AT320 (60/40) |
| 26 | IOTEK 8000 | IOTEK 7030 | PP8102/AT320 (60/40) | PP8102/AT320 (50/50) |
| 27 | IOTEK 8000 | IOTEK 7030 | PP8102/AT320 (50/50) | PP8102 |
| 28 | IOTEK 8000 | IOTEK 7030 | PP8102/AT320 (40/60) | PP8102/AT320 (50/50) |

TABLE 5-continued

Example 21-38 compositions wherein a polypropylene-based material is the substrate

| example | exterior ionomer layer | pigmented ionomer layer | first tie-layer material | second tie-layer material[3] |
|---|---|---|---|---|
| 29 | IOTEK 8000 | IOTEK 7030 | ESCOR XV4.04 | XV4.04/PP7032-E2 (50/50) |
| 30 | EX 7010.01[1] | EX 7010.01[1] | XV4.04/I-134 (40/60) | PP7032-E2/I-134 (90/10) |
| 31 | IOTEK 8000/7030 (75/25)[2] | IOTEK 8000 | XV4.04/I-134 (40/60) | PP7032-E2/I-134 (90/10) |
| 32 | IOTEK 8000/3110 (75/25) | IOTEK 8000 | XV4.04/I-134 (40/60) | PP7032-E2/I-134 (90/10) |
| 33 | IOTEK 8000 | IOTEK 8000 | XV4.04/I-134 (50/50) | PP7032-E2/I-134 (90/10) |
| 34 | IOTEK 8000 | IOTEK 7030 | PP8102/AT320 (67/33) | — |
| 35 | IOTEK 8000 | IOTEK 7030 | PP8102/AT320 (65/35) | — |
| 36 | IOTEK 8000 | IOTEK 7030 | PP8102/AT320 (60/40) | — |
| 37 | IOTEK 8000 | IOTEK 7030 | PP8102/MD353D | — |
| 38 | IOTEK 8000 | IOTEK 7030 | PP8102/MZ203D | — |

[1]EX7010.01 is an $C_2$/AA copolymer, neutralized 35% with Zn and Na cations.

[2]All ratios in parenthesis are wt % ratios of the given resins.

[3]If there is no second tie-layer material, the first tie-layer is the "backing layer", otherwise, the second tie-layer is the backing layer.

TABLE 6

Example 39-47 compositions wherein a polyethylene-based material is the substrate

| example | exterior ionomer layer | pigmented ionomer layer | first tie-layer material | backing layer |
|---|---|---|---|---|
| 39 | IOTEK 8000 | IOTEK 7030 | HD9856/AT320 (75/25) | — |
| 40 | IOTEK 8000 | IOTEK 7030 | HD9856/AT320 (35/65) | — |
| 41 | IOTEK 8000 | IOTEK 7030 | 357C32/AT320 (65/35) | — |
| 42 | IOTEK 8000 | IOTEK 7030 | HD9856/AT320 (35/65) | — |
| 43 | IOTEK 8000 | IOTEK 7030 | HD9856/AT310 65/35) | — |
| 44 | IOTEK 8000 | IOTEK 7030 | HD9856/AT310 (35/65) | — |
| 45 | IOTEK 8000 | IOTEK 7030 | 357C32/AT310 (35/65) | — |
| 46 | IOTEK 8000 | IOTEK 7030 | AT310 | — |
| 47 | IOTEK 8000 | IOTEK 7030 | AT320 | — |

TABLE 7A

Adhesion Testing of examples 21-33.

| example | 180° Peel Test between layers ASTM D1093 | 180° Peel Test of laminate to substrate ASTM D1093 |
|---|---|---|
| 21 | excellent adhesion-no separation recorded | 20 lbs. (89 N) |
| 22 | 10 lbs. (44 N) | 20 lbs. (89 N) |
| 23 | <2 lbs. (<9 N) | not tested-poor adhesion |
| 24 | <2 lbs. (<9 N) | not tested-poor adhesion |
| 25 | <2 lbs. (<9 N) | not tested-poor adhesion |
| 26 | <2 lbs. (<9 N) | not tested-poor adhesion |
| 27 | <2 lbs. (<9 N) | not tested-poor adhesion |
| 28 | <2 lbs. (<9 N) | not tested-poor adhesion |
| 29 | 10 lbs. (44 N) | 18 lbs. (80 N) |
| 30 | 15 lbs. (67 N) | 20 lbs. (89 N) |

TABLE 7A-continued

Adhesion Testing of examples 21-33.

| example | 180° Peel Test between layers ASTM D1093 | 180° Peel Test of laminate to substrate ASTM D1093 |
|---|---|---|
| 31 | 17 lbs. (76 N) | 21 lbs. (93 N) |
| 32 | 13 lbs. (58 N) | 18 lbs. (80 N) |
| 33 | 10 lbs. (44 N) | 18 lbs. (80 N) |

TABLE 7B

Adhesion Testing of examples 39-47.

| example | 180° Peel Test between layers ASTM D1093 | 180° Peel Test of laminate to substrate ASTM D1093 |
|---|---|---|
| 39 | excellent adhesion-no separation recorded | excellent adhesion-no separation recorded |
| 40 | excellent adhesion-no separation recorded | excellent adhesion-no separation recorded |
| 41 | 8 lbs. (36 N) | <2 lbs. (<9 N) |
| 42 | excellent adhesion-no separation recorded | excellent adhesion-no separation recorded |
| 43 | excellent adhesion-no separation recorded | excellent adhesion-no separation recorded |
| 44 | excellent adhesion-no separation recorded | excellent adhesion-no separation recorded |
| 45 | excellent adhesion-no separation recorded | excellent adhesion-no separation recorded |
| 46 | excellent adhesion-no separation recorded | excellent adhesion-no separation recorded |
| 47 | excellent adhesion-no separation recorded | excellent adhesion-no separation recorded |

TABLE 8

Scratch and Mar Resistance of two examples compared to a painted polypropylene surface.

| Test | method | IOTEK 8000, PP 8224 substrate, Example 31 | IOTEK 8000, HD6908 substrate, Example 46 | painted PP88224 substrate |
|---|---|---|---|---|
| scuff resistance, stylus A, 2 lb. (0.9 kg) load, 1000 cycles at 23° C. | GM 9911P | 0% removal | 0% removal | 0% removal, 500 g, 500 cycles |
| 90° gravelometer, | SAE J400 | | | |
| 2 & 5 pints at −20° F. (−29° C.) | | 10 | 10 | 6A to 8B |
| 2 & 5 pints at 70° F. (21° C.) | | 10 | 10 | 6A to 8B |
| 45° gravelometer | SAE J400 | | | |
| 2 & 5 pints at −20° F. (−29° F.) | | 10 | 10 | 6A to 8B |
| 2 & 5 pints at 70° F. (21° C.) | | 10 | 10 | 6A to 8B |
| 5 finger scratch; load: | FLTMBN108-13 | | | |
| 5 N | | 1 | 1 | 3 |
| 7 N | | 1 | 1 | 3 |
| 10 N | | 2 | 2 | 4 |
| 15 N | | 3 | 3 | 5 |
| 20 N | | 4 | 4 | 5 |

We claim:

1. A laminate comprising a tie-layer having a first side and a second side, wherein the first side is secured to at least one layer of ionomer, and wherein the tie-layer comprises one or more layers of material selected from acid copolymers and blends of acid copolymer and a polyolefin polymer, and the melt indexes of adjacent laminate layers are within 4 dg/min of one another.

2. The laminate of claim 1, wherein the at least one ionomer layer has a peak melt temperature of at least greater than 70° C.

3. The laminate of claim 1, wherein the at least one ionomer layer comprises two ionomer layers.

4. The laminate of claim 1, wherein at least one layer is pigmented.

5. The laminate of claim 1, comprising two ionomer layers secured to a tie-layer, the acid copolymer comprising ethylene (meth)acrylic acid terpolymer and the polyolefin polymer is selected from propylene polymers, ethylene polymers, and blends thereof.

6. The laminate of claim 1, wherein the polyolefin polymer is selected from ethylene polymers, ethylene copolymers, propylene polymers, propylene copolymers, propylene impact copolymer, a blend of propylene impact copolymer and ethylene plastomer, and mixtures thereof.

7. The laminate of claim 1, wherein the polyolefin polymer is present in the at least one tie-layer from 30 wt % to 70 wt %.

8. The laminate of claim 1, wherein the polyolefin polymer is present in the at least one tie-layer from 40 wt % to 60 wt %.

9. The laminate of claim 1, wherein the at least one tie-layer material comprises a blend of ethylene meth(acrylic) acid terpolymer and a propylene polymer.

10. The laminate of claim 1, wherein the at least one tie-layer material comprises a blend of ethylene meth(acrylic) acid terpolymer and an ethylene polymer.

11. The laminate of claim 1, wherein the at least one tie-layer material comprises a blend of ethylene meth(acrylic) acid terpolymer, liner low density polyethylene, and high density polyethylene.

12. The laminate of claim 1, wherein the tie-layer comprises two layers of material secured to one another, wherein a first layer is secured to the at least one ionomer.

13. The laminate of claim 1, wherein the polyolefin polymer material has a 1% secant flexural modulus of greater than 500 MPa.

14. The laminate of claim 1, wherein the polyolefin polymer material has a 1% secant flexural modulus of greater than 200 MPa.

15. The laminate of claim 1, wherein the laminate is formed into the shape of an article.

16. The laminate of claim 15, wherein the article is selected from appliance parts, automotive parts, and sporting equipment parts.

17. The laminate of claim 15, wherein the article is selected from a bumper, dashboard, interior trim, fuel tank, body panel, boat hull, airbag door, and automotive door panels.

18. A composite comprising a tie-layer having a first side and a second side, wherein the first side is secured to at least one layer of ionomer, and the second side is secured to a substrate comprising at least one thermoplastic; and wherein the tie-layer comprises one or more layers of material selected from acid copolymers and blends of acid copolymer and a polyolefin polymer, and the melt indexes of adjacent laminate layers are within 4 dg/min of one another.

19. The composite of claim 18, wherein the at least one ionomer layer has a peak melt temperature of at greater than 70° C.

20. The composite of claim 18, wherein the at least one ionomer layer comprises two ionomer layers.

21. The composite of claim 18, wherein at least one layer is pigmented.

22. The composite of claim 18, comprising two ionomer layers secured to a tie-layer, the acid copolymer comprising ethylene (meth)acrylic acid terpolymer and the polyolefin polymer is selected from propylene polymers, ethylene polymers, and blends thereof.

23. The composite of claim 18, wherein the polyolefin polymer is selected from ethylene polymers, ethylene copolymers, propylene polymers, propylene copolymers, propylene impact copolymer, a blend of propylene impact copolymer and ethylene plastomer, and mixtures thereof.

24. The composite of claim 18, wherein the polyolefin polymer is present in the at least one tie-layer from 30 wt % to 70 wt %.

25. The composite of claim 18, wherein the polyolefin polymer is present in the at least one tie-layer from 40 wt % to 60 wt %.

26. The composite of claim 18, wherein the at least one tie-layer material comprises a blend of an ethylene (meth) acrylic acid terpolymer and a propylene polymer.

27. The composite of claim 18, wherein the at least one tie-layer material comprises a blend of ethylene (meth)acrylic acid terpolymer and an ethylene polymer.

28. The composite of claim 18, wherein the at least one tie-layer material comprises a blend of ethylene (meth)acrylic acid terpolymer, linear low density polyethylene, and high density polyethylene.

29. The composite of claim 18, wherein the tie-layer comprises at least two layers of material secured to one another, wherein a first layer is secured to the at least one ionomer.

30. The composite of claim 29, wherein a backing layer comprising a blend of at least two layers of material is secured to the substrate.

31. The composite of claim 18, wherein the polyolefin material has a 1% secant flexural modulus of greater than 500 MPa.

32. The composite of claim 18, wherein the polyolefin material has a 1% secant flexural modulus of greater than 200 MPa.

33. The composite of claim 18, wherein the composite is formed into the shape of an end use article.

34. The composite of claim 33, wherein the article is selected from appliance parts, automotive parts, and sporting equipment parts.

35. The composite of claim 33, wherein the article is selected from a bumper, dashboard, interior trim, fuel tank, body panel, boat hull, airbag door, and automotive door panels.

36. A shaped laminate comprising at least one layer of ionomer material and a tie-layer securable to a substrate material, the tie layer comprising at least one backing layer; and wherein the backing layer comprises a blend of at least one ethylene (meth)acrylic acid terpolymer and at least one substrate material and the melt indexes of adjacent laminate layers are within 5 dg/min of one another.

37. The shaped laminate of claim 36, wherein the shaped laminate comprises at least two ionomer layers.

38. The shaped laminate of claim 36, wherein the substrate material has a 1% secant flexural modulus of greater than 100 MPa.

39. The shaped laminate of claim 36, wherein the at least one ionomer layer comprises an external layer and a second layer.

40. The shaped laminate of claim 39, wherein the second layer includes a pigment.

41. The shaped laminate of claim 36, wherein the substrate material is selected from EPDM (ethylene-propylene-diene monomer), EP (ethylene-propylene rubber), acrylonitrile-butadiene-styrene terpolymer, acetal polymer, acrylic polymers, cellulosics, fluoroplastics, nylon and other polyamides, polyamide-imide, polycarbonate, polyester, polyetheretherketone, polyetherimide, polyethylene, polyimide, polyphenylene, polyphenylene sulfide, plastomer, polypropylene, polypropylene impact copolymers, polystyrene, polysulfone, polyurethane, polyvinyl chloride, and foams of such materials, as well as blends of these materials.

42. The shaped laminate of claim 36, wherein the substrate is present in the backing layer from 10 wt % to 80 wt % of the backing layer.

43. The shaped laminate of claim 36, wherein the ethylene (meth)acrylic acid terpolymer further comprises alkyl acrylate derived units.

44. The shaped laminate of claim 43, wherein the alkyl acrylate derived unit is selected from methyl acrylate, ethyl acrylate, propyl acrylate, butyl acrylate and combinations thereof.

45. The shaped laminate of claim 36, wherein the thickness of the shaped laminate is from 200 μm to 6000 μm.

46. The shaped laminate of claim 36, wherein the at least one ionomer layer is a blend of two or more ionomers.

47. The shaped laminate of claim 46, wherein the blend is a blend of a zinc-neutralized ionomer and a sodium-neutralized ionomer.

48. The shaped laminate of claim 46, wherein the at least one ionomer or ionomer blend has a melt index of from 0.2 dg/min to 8 dg/min.

49. An exterior automotive body part made from the shaped laminate of claim 36.

50. An appliance body part made from the shaped laminate of claim 36.

51. A composite article comprising at least one layer of ionomer material, a tie-layer securable to a substrate material, and a substrate material secured to the tie-layer; the tie layer comprising at least one backing layer secured to the substrate; and wherein the backing layer comprises a blend of at least one ethylene (meth)acrylic acid polymer and at least one substrate material; and wherein the melt indexes of adjacent composite layers are within 5 dg/min of one another.

52. The composite article of claim 51, wherein the article comprises at least two ionomer layers.

53. The composite article of claim 51, wherein the substrate material has a 1% secant flexural modulus of greater than 100 MPa.

54. The composite article of claim 51, wherein the at least one ionomer layer comprises an external layer and a second layer.

55. The composite article of claim 51, wherein the second layer includes a pigment.

56. The composite article of claim 51, wherein the substrate material is selected from EPDM (ethylene-propylene-diene monomer), EP (ethylene-propylene rubber), acrylonitrile-butadiene-styrene terpolymer, acetal polymer, acrylic polymers, cellulosics, fluoroplastics, nylon and other polyamides, polyamide-imide, polycarbonate, polyester, polyetheretherketone, polyetherimide, polyethylene, polyimide, polyphenylene, polyphenylene sulfide, plastomer, polypropylene, polypropylene impact copolymers, polystyrene, polysulfone, polyurethane, polyvinyl chloride, and foams of such materials, as well as blends of these materials.

57. The composite article of claim 51, wherein the substrate material is present in the backing layer from 10 wt % to 80 wt % of the backing layer.

58. The composite article of claim 51, wherein the ethylene (meth)acrylic acid polymer is a terpolymer further comprising alkyl acrylate derived units.

59. The composite article of claim 58, wherein the alkyl acrylate derived unit is selected from methyl acrylate, ethyl acrylate, propyl acrylate, butyl acrylate and combinations thereof.

60. The composite article of claim 51, wherein the thickness of the shaped laminate is from 200 μm to 6000 μm.

61. The composite article of claim 51, wherein the at least one ionomer layer is a blend of two or more ionomers.

62. The composite article of claim 61, wherein the blend is a blend of a zinc-neutralized ionomer and a sodium-neutralized ionomer.

63. The composite article of claim 61, wherein the at least one ionomer or ionomer blend has a melt index of from 0.2 dg/min to 8 dg/min.

64. The composite article of claim 51 in the form of an external automotive body part.

65. The composite article of claim 51 in the form of an appliance body part.

66. A method of forming a laminate suitable for an impact resistant article comprising forming a laminate, the laminate having at least one layer of ionomer and a tie-layer comprising at least one layer of material selected from the group consisting of ethylene (meth)acrylic acid terpolymer and blends of ethylene (meth)acrylic acid terpolymer and a polyolefin polymer, wherein the at least one ionomer layer and tie-layer contact one another to form the laminate and the melt indexes of adjacent laminate layers are within 5 dg/min of one another.

67. The method of claim 66, wherein the laminate is formed by co-extrusion.

68. The method of claim 67, wherein the ionomer melt temperatures are from greater than 200° C.

69. The method of claim 67, wherein the co-extrusion process temperatures for the tie-layer is from 200° C. to 255° C.

70. The method of claim 66, wherein the laminate comprises a second ionomer layer.

71. The method of claim 66, wherein at least one ionomer layer is pigmented.

72. The method of claim 66, wherein the polyolefin polymer is selected from ethylene polymers, ethylene copolymers, propylene polymers, propylene copolymers, propylene impact copolymer, a blend of propylene impact copolymer and ethylene plastomer, and mixtures thereof.

73. The method of claim 66, further comprising the step of shaping the laminate into the shape of a desirable end use article.

74. The method of claim 73, wherein the shaping is performed by thermoforming.

75. The method of claim 73, wherein the shaping is performed by blow molding.

76. The method of claim 66, wherein the at least one ionomer layer is two ionomer layers.

77. The method of claim 66, wherein the melt indexes of adjacent laminate layers are within less than 4 dg/min of one another.

78. The method of claim 66, wherein the tie-layer comprises a blend of ethylene (meth)acrylic acid terpolymer and a polyethylene.

79. The method of claim 66, wherein the tie-layer comprises a blend of ethylene (meth)acrylic acid terpolymer, linear low density polyethylene, and high density polyethylene.

80. The method of claim 73, wherein the end use article is an external automotive body part.

81. The method of claim 73, wherein the end use article is an appliance body part.

82. A method of forming shaped a laminate comprising forming a laminate; and forming the laminate into the shape of an end use article, the laminate having at least one layer of ionomer and a tie-layer comprising an ethylene (meth)acrylic acid copolymer and a polyolefin polymer, wherein the at least one ionomer layer and tie-layer are secured to one another to form the shaped laminate and the melt indexes of adjacent laminate layers are within 5 dg/min of one another.

83. The method of claim 82, wherein the laminate comprises two ionomer layers.

84. The method of claim 82, wherein at least one ionomer layer is pigmented.

85. The method of claim 82, wherein the polyolefin polymer is selected from ethylene polymers, ethylene copolymers, propylene polymers, propylene copolymers, propylene impact copolymer, a blend of propylene impact copolymer and ethylene plastomer, and mixtures thereof.

86. The method of claim 82, wherein the ethylene (meth) acrylic acid copolymer is a terpolymer further comprising alkyl acrylate derived units.

87. The method of claim 86, wherein the alkyl acrylate derived unit is selected from methyl acrylate, ethyl acrylate, propyl acrylate, butyl acrylate and combinations thereof.

88. The method of claim 82, wherein the thickness of the laminate is from 200 μm to 6000 μm.

89. The method of claim 82, wherein the melt indexes of adjacent laminate layers are within less than 4 dg/min of one another.

90. The method of claim 82, wherein the at least one ionomer layer is a blend of two or more ionomers.

91. The method of claim 82, wherein the blend is a blend of a zinc-neutralized ionomer and a sodium-neutralized ionomer.

92. The method of claim 91, wherein the at least one ionomer or ionomer blend has a melt index of from 0.2 dg/min to 8 dg/min.

93. The method of claim 82, wherein the laminate is formed by a co-extrusion process.

94. The method of claim 93, wherein the at least one ionomer layer is co-extruded at a temperature of from 180° C. to 230° C.

95. The method of claim 93, wherein the final material melt temperature of the co-extruded ionomer is from greater than 200° C.

96. The method of claim 93, wherein the tie-layer materials are co-extruded at a temperature of from 200° C. to 255° C.

97. The method of claim 93, wherein the final melt temperature of the co-extruded tie-layer materials is from 190° C. to 250° C.

98. The method of claim 82, wherein the laminate is shaped by thermoforming.

99. The method of claim 82, wherein the laminate is shaped by blow molding.

100. An external automotive body part made by the method of claim 82.

101. An appliance body part made by the method of claim 82.

102. A method of forming a composite article comprising:

(a) forming a laminate;

(b) forming the laminate into a shape, the laminate having at least one layer of ionomer and a tie-layer, wherein the tie-layer comprises an ethylene (meth)acrylic acid copolymer and a polyolefin polymer and the melt indexes of adjacent laminate layers are within 5 dg/min of one another; and (c) securing a substrate to the tie-layer of the laminate to form the composite article, wherein the substrate has a 1% secant flexural modulus of greater than 100 MPa.

103. The method of claim 102, wherein the laminate comprises two ionomer layers.

104. The method of claim 102, wherein at least one ionomer layer is pigmented.

105. The method of claim 102, wherein the polyolefin polymer is selected from ethylene polymers, ethylene copolymers, propylene polymers, propylene copolymers, propylene impact copolymer, a blend of propylene impact copolymer and ethylene plastomer, and mixtures thereof.

106. The method of claim 102, wherein the securing step is further defined by injection molding the substrate to the tie-layer of the shaped laminate.

107. The method of claim 102, wherein the securing step is further defined by spraying the substrate to the tie-layer of the shaped laminate.

108. The method of claim 102, wherein the substrate is a polyolefin selected from ethylene polymers, ethylene copolymers, propylene polymers, propylene copolymers, propylene impact copolymer, a blend of propylene impact copolymer and ethylene plastomer, and mixtures thereof.

109. The method of claim 102, wherein the laminate is thermoformed into the shaped laminate.

110. The method of claim 102, wherein the laminate is blow molded to form the shaped laminate.

111. The method of claim 102, wherein the tie-layer comprises a blend of ethylene (meth)acrylic acid terpolymer and a polypropylene.

112. The method of claim 102, wherein the tie-layer comprises a blend of ethylene (meth)acrylic acid terpolymer, linear low density polyethylene, and high density polyethylene.

113. An external automotive body part made by the method of claim 102.

114. An appliance body part made by the method of claim 102.

115. A method of forming a composite article comprising:

(a) co-extruding at least two materials to form a laminate;

(b) thermoforming or blow molding the laminate into a shape, the laminate having at least one layer of ionomer and a tie-layer having at least one layer comprising an ethylene (meth)acrylic acid polymer, and wherein the melt indexes of adjacent laminate layers are within 5 dg/min of one another; and (c) injection molding a substrate layer to the tie-layer of the laminate to form the composite article.

116. The method of claim 115, wherein the laminate has a second ionomer layer.

117. The method of claim 115, wherein the tie-layer further comprises at least one layer of material selected from an ethylene (meth)acrylic acid polymer, a polyolefin polymer, or blends thereof.

118. The method of claim 117, wherein the polyolefin polymer is selected from ethylene polymers, ethylene copolymers, propylene polymers, propylene copolymers, propylene impact copolymer, a blend of propylene impact copolymer and ethylene plastomer, and mixtures thereof.

119. The method of claim 115, wherein the tie-layer comprises a blend of an ethylene (meth)acrylic acid terpolymer and a polyolefin, the polyolefin present in the blend from 30 wt % to 70 wt % of the blend.

120. The method of claim 115, wherein the at least one ionomer layer is extruded at a material melt temperature of greater than 200° C.

121. The method of claim 115, wherein the substrate is a polyolefin polymer selected from ethylene polymers, ethylene copolymers, propylene polymers, propylene copolymers, propylene impact copolymer, a blend of propylene impact copolymer and ethylene plastomer, and mixtures thereof.

122. The method of claim 115, wherein the tie-layer comprises a blend of ethylene (meth)acrylic acid terpolymer and a polypropylene.

123. The method of claim 115, wherein the tie-layer comprises a blend of etheylene (meth)acrylic acid terpolymer, linear low density polyethylene, and high density polyethylene.

124. The method of claim 115, wherein the at least one ionomer layer is co-extruded at a temperature of from 180° C. to 230° C.

125. The method of claim 115, wherein the final melt temperature of the co-extruded ionomer is from 200° C. to 220° C.

126. The method of claim 115, wherein the tie-layer materials are co-extruded at a temperature of from 200° C. to 255° C.

127. The method of claim 115, wherein the final melt temperature of the co-extruded tie-layer materials is from 190° C. to 250° C.

128. The method of claim 115, wherein the substrate material has a 1% secant flexural modulus of greater than 100 MPa.

129. An external automotive body part made by the method of claim 115.

130. An appliance body part made by the method of claim 115.

131. A composite article formed by the method comprising:

(a) forming a laminate of at least one ionomer and a tie-layer, the at least one ionomer layer including an external layer and the tie-layer comprising at least an ethylene (meth)acrylic acid copolymer and a polyolefin polymer and including a backing layer;

(b) forming a shape from the laminate, resulting in a shaped laminate; and (c) securing a substrate material to the shaped laminate such that the substrate material is secured to the backing layer.

132. The composite article of claim 131, wherein the laminate is blow molded to form the shaped laminate.

133. The composite article of claim 131, wherein the laminate is thermoformed to form the shaped laminate.

134. The composite article of claim 131, wherein the substrate material is injection molded onto the shaped laminate to form the composite article.

135. The composite article of claim 131, wherein the substrate is blow molded onto the shaped laminate to form the composite article.

136. The composite article of claim 131, wherein the article comprises at least two ionomer layers.

137. The composite article of claim 131, wherein at least one ionomer layer includes a pigment.

138. The composite article of claim 131, wherein the at least two ionomer layers comprise an external layer and a second layer.

139. The composite article of claim 138, wherein the second layer includes a pigment.

140. The composite article of claim 131, wherein the backing layer is a blend of an ethylene (meth)acrylic acid polymer and a substrate material, the substrate material present in the backing layer from 10 wt % to 80 wt % of the backing layer.

141. The composite article of claim 131, wherein the substrate material is selected from EPDM (ethylene-propylene-diene monomer), EP (ethylene-propylene rubber), acrylonitrile-butadiene-styrene terpolymer, acetal polymer, acrylic polymers, cellulosics, fluoroplastics, nylon and other polyamides, polyamide-imide, polycarbonate, polyester, polyetheretherketone, polyetherimide, polyethylene, polyimide, polyphenylene, polyphenylene sulfide, plastomer, polypropylene, polypropylene impact copolymers, polystyrene, polysulfone, polyurethane, polyvinyl chloride, and foams of such materials, as well as blends of these materials.

142. The composite article of claim 131, wherein the tie-layer an ethylene (meth)acrylic terpolymer further comprising alkyl acrylate derived units.

143. The composite article of claim 142, wherein the alkyl acrylate derived unit is selected from methyl acrylate, ethyl acrylate, propyl acrylate, butyl acrylate and combinations thereof.

144. The composite article of claim 131, wherein the thickness of the shaped laminate is from 200 μm to 6000 μm.

145. The composite article of claim 131, wherein the at least one ionomer layer is a blend of two or more ionomers.

146. The composite article of claim 145, wherein the blend is a blend of a zinc-neutralized ionomer and a sodium-neutralized ionomer.

147. The composite article of claim 145, wherein the at least one ionomer or ionomer blend has a melt index of from 0.2 dg/min to 8 dg/min.

148. The composite article of claim 131, wherein the laminate is formed by a co-extrusion process.

149. The composite article of claim 148, wherein the at least one ionomer layer is co-extruded at a temperature of from 180° C. to 230° C.

150. The composite article of claim 148, wherein the final melt temperature of the co-extruded ionomer is from 200° C. to 220° C.

151. The composite article of claim 148, wherein the tie-layer materials are co-extruded at a temperature of from 200° C. to 255° C.

152. The composite article of claim 148, wherein the final melt temperature of the co-extruded tie-layer materials is from 190° C. to 250° C.

153. The composite article of claim 131, wherein the substrate material has a 1% secant flexural modulus of greater than 100 MPa.

154. The composite article of claim 131, wherein the composite article is in the form of an automotive body part selected from bumpers, grills, deck lids, rocker panels, body panels, fenders, doors, hoods, mirror housings, wheel covers, trim, pillar trim, dash boards, seat covers, instrument panels, cup and personal containers and holders.

155. The composite article of claim 131, wherein the at least one ionomer layer is a copolymer of ethylene derived units and acrylic acid derived units neutralized with sodium and zinc ions to from 10% to 50%.

156. The composite article of claim 131, wherein the composite article in the form of an appliance body part.

* * * * *